US012553093B1

(12) United States Patent
Ruddy et al.

(10) Patent No.: US 12,553,093 B1
(45) Date of Patent: Feb. 17, 2026

(54) METHODS OF DETECTING, IDENTIFYING AND QUANTIFYING WILD SPIKE PROTEIN AND COVID VACCINE SPIKE PROTEINS

(71) Applicant: Wolf of Zion, Inc., Stroudsburg, PA (US)

(72) Inventors: Kathleen T. Ruddy, Madison, NJ (US); Nicholas J. Bevins, San Diego, CA (US)

(73) Assignee: Wolf of Zion, Inc., Stroudsburg, PA (US)

( * ) Notice: Subject to any disclaimer, the term of this patent is extended or adjusted under 35 U.S.C. 154(b) by 0 days.

(21) Appl. No.: 19/091,651

(22) Filed: Mar. 26, 2025

(51) Int. Cl.
*C12Q 1/70* (2006.01)
*C12Q 1/6851* (2018.01)

(52) U.S. Cl.
CPC ........... *C12Q 1/701* (2013.01); *C12Q 1/6851* (2013.01)

(58) Field of Classification Search
CPC .............................. C12Q 1/701; C12Q 1/6851
See application file for complete search history.

(56) References Cited

U.S. PATENT DOCUMENTS

| | | | | |
|---|---|---|---|---|
| 8,354,514 | B2 * | 1/2013 | Siezak | C12Q 1/701 536/23.1 |
| 11,999,766 | B2 * | 6/2024 | Kraemer-Kuehl | A61P 31/14 |
| 2011/0319283 | A1 * | 12/2011 | Thompson | C12Q 1/6816 506/16 |
| 2013/0266934 | A1 * | 10/2013 | Weise | C12Q 1/70 435/5 |
| 2017/0039316 | A1 * | 2/2017 | Fofanov | G16B 30/10 |
| 2020/0354410 | A1 * | 11/2020 | Kraemer-Kuehl | C07K 14/005 |
| 2022/0356535 | A1 * | 11/2022 | Kosuri | C12Q 1/6853 |
| 2024/0018609 | A1 * | 1/2024 | Kalkum | C12Q 1/701 |
| 2024/0339174 | A1 | 10/2024 | Muik | |
| 2024/0376558 | A1 * | 11/2024 | Shuaib | C12Q 1/701 |
| 2024/0385189 | A1 | 11/2024 | Alvarez et al. | |

OTHER PUBLICATIONS

Cankat, S., Demael, M. U., & Swadling, L. (2024). In search of a pan-coronavirus vaccine: next-generation vaccine design and immune mechanisms. Cellular & molecular immunology, 21(2), 103â118. (Year: 2024).*

Dolgin E. (2022). Pan-coronavirus vaccine pipeline takes form. Nature reviews. Drug discovery, 21(5), 324â326 (Year: 2022).*

Guo, L. et al. (2020). Profiling Early Humoral Response to Diagnose Novel Coronavirus Disease (COVID-19). Clinical infectious diseases: an official publication of the Infectious Diseases Society of America, 71 (15), 778-785. (Year: 2020).*

Morens, D. M., Taubenberger, J. K., & Fauci, A. S. (2022). Universal Coronavirus Vaccines â An Urgent Need. The New England Journal of Medicine, 386(4), 297â299. (Year: 2022).*

Sariol, A., & Perlman, S. (2020). Lessons for COVID-19 Immunity from Other Coronavirus Infections. Immunity (Cambridge, Mass.), 53(2), 248â263. (Year: 2020).*

Shen C, Bradford SA.2021.Why are Viruses Spiked?. mSphere6:10.1128/msphere.01339-20. (Year: 2021).*

Zhou, J., Liu, Z., Zhang, G., Xu, W., Xing, L., Lu, L., Wang, Q., & Jiang, S. (2023). Development of variantaproof severe acute respiratory syndrome coronavirus 2, panasarbecovirus, and panâÎâcoronavirus vaccines. Journal of Medical Virology, 95(1), e28172-n/a. (Year: 2023).*

Duckmanton LM, Tellier R, Liu P, Petric M. Bovine torovirus: sequencing of the structural genes and expression of the nucleocapsid protein of Breda virus. Virus Res. Nov. 1998;58(1-2):83-96. (Year: 1998).*

Wickramasinghe IN, van Beurden SJ, Weerts EA, Verheije MH. The avian coronavirus spike protein. Virus Res. Dec. 19, 2014;194: 37-48. (Year: 2016).*

Motokawa K, Hohdatsu T, Hashimoto H, Koyama H. Comparison of the amino acid sequence and phylogenetic analysis of the peplomer, integral membrane and nucleocapsid proteins of feline, canine and porcine coronaviruses. Microbiol Immunol. 1996;40(6):425-33. (Year: 1996).*

Siddell SG, Anderson R, Cavanagh D, Fujiwara K, Klenk HD, Macnaughton MR, Pensaert M, Stohlman SA, Sturman L, van der Zeijst BA. Coronaviridae. Intervirology. 1983;20(4):181-9. (Year: 1983).*

Wang, Leyi., ed. Animal Coronaviruses. 2nd ed. 2022. New York, NY: Springer US, 2022. (Year: 2022).*

(Continued)

*Primary Examiner* — Janet L Andres
*Assistant Examiner* — Carey Alexander Stuart
(74) *Attorney, Agent, or Firm* — Wilkinson Law Office; Clinton H. Wilkinson

(57) ABSTRACT

A method of detecting, identifying and quantifying a wild spike protein and/or virus vaccine spike protein in a patient by: (a) providing a patient sample that may include at least one spike protein (wild spike protein and/or a virus vaccine spike protein) with at least one corresponding synthetic RNA, wherein its sequence differs from natural nucleic acid sequences; (b) isolating RNA from the sample; (c) performing a reverse transcription polymerase reaction on the sample of RNA to obtain a lysed, reverse transcribed sample of cDNA utilizing at least one primer set from the group consisting of VAXX-specific primers, wild spike protein-specific primers and combinations thereof, and at least one probe set; (d) performing an amplification reaction on the lysed, reverse transcribed sample of cDNA to obtain an amplified analyzable sample of the cDNA; and, (e) performing a quantitative analysis. A custom computer program creates candidate primer lists.

26 Claims, 4 Drawing Sheets

Specification includes a Sequence Listing.

(56) References Cited

OTHER PUBLICATIONS

Wickramasinghe IN, van Beurden SJ, Weerts EA, Verheije MH. The avian coronavirus spike protein. Virus Res. Dec. 19, 2014;194: 37-48. (Year: 2014).*
Tudor Emanuel Fertig et al., Vaccine mRNA Can Be Detected in Blood at 15 Days Post-Vaccination, Biomedicines, 2022, 10, 1538. Switzerland. https://doi.org/10.3390/biomedicines10071538.

* cited by examiner

```
┌─────────────────────────────────────────────────────────────┐
│   PRESENT INVENTION METHOD OF DETECTING,                    │
│   IDENTIFYING AND QUANTIFYING A WILD SPIKE PROTEIN          │ — 1
│   AND/OR A VIRUS VACCINE SPIKE PROTEIN IN A PATIENT         │
└─────────────────────────────────────────────────────────────┘
                              ↓
┌─────────────────────────────────────────────────────────────┐
│ (a) Providing a patient biological sample that may include  │
│ at least one of: wild spike protein and/or a virus vaccine  │ — 3
│ spike protein with at least one corresponding synthetic     │
│ RNA, wherein the RNA sequence differs from naturally        │
│ occurring nucleic acid sequences;                           │
└─────────────────────────────────────────────────────────────┘
                              ↓
┌─────────────────────────────────────────────────────────────┐
│ (b) Isolating RNA from the biological sample by producing   │ — 5
│ a lysed biological sample of RNA;                           │
└─────────────────────────────────────────────────────────────┘
                              ↓
┌─────────────────────────────────────────────────────────────┐
│ (c) Performing a reverse transcription polymerase reaction  │
│ on the lysed biological sample of RNA to obtain a lysed,    │
│ reverse transcribed biological sample of cDNA utilizing at  │
│ least one primer set from the group consisting of           │ — 7
│ VAXX-specific primers, wild spike protein-specific primers  │
│ and combinations thereof and at least one probe set         │
│ selected from the group consisting of VAXX-specific         │
│ probes, wild spike protein-specific probes and              │
└─────────────────────────────────────────────────────────────┘
                              ↓
              ┌─────────────────────────────┐
              │   CONTINUED AT FIGURE 2     │
              └─────────────────────────────┘
```

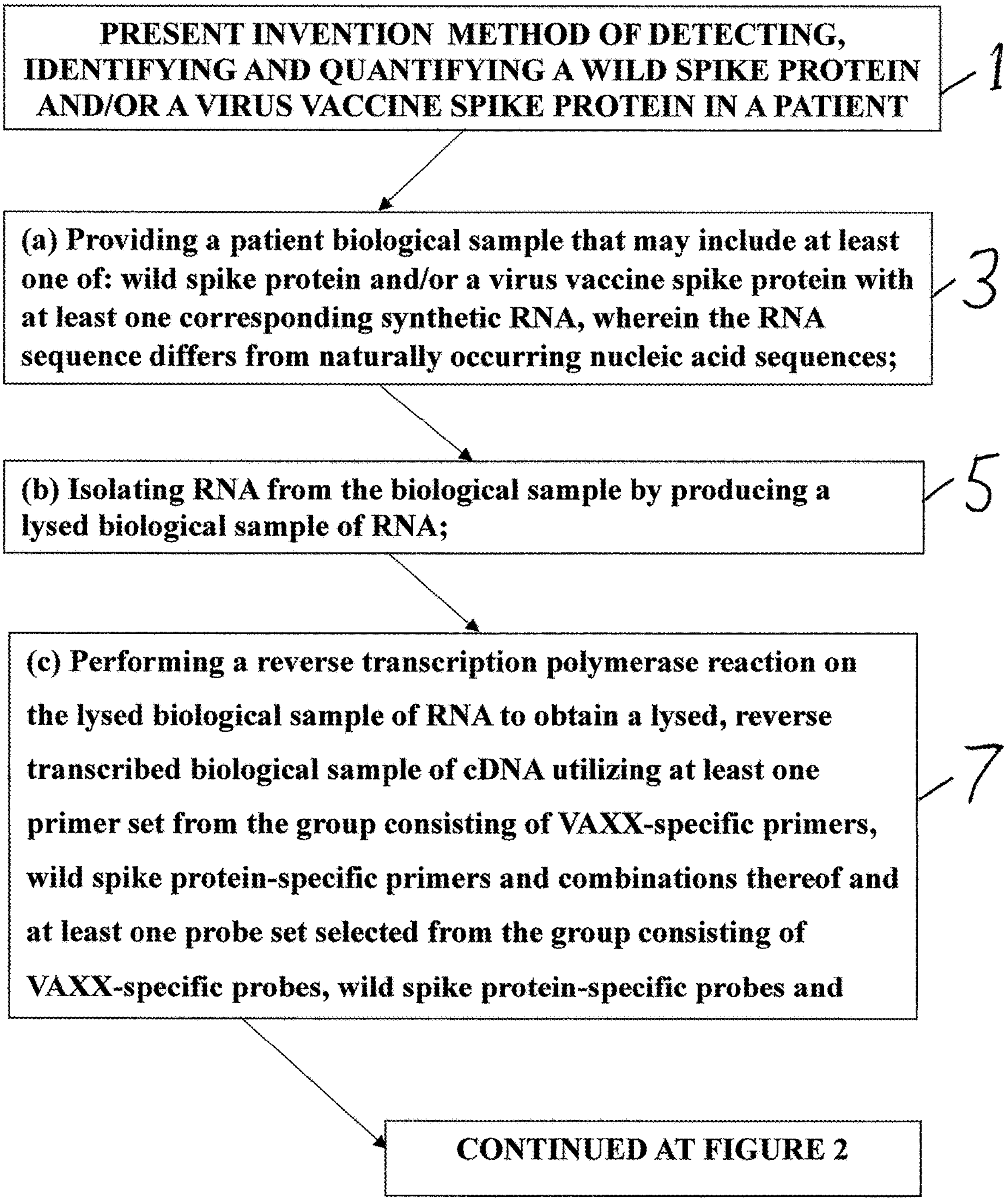

FIGURE 1

CONTINUED FROM FIGURE 1

(d) Performing an amplification reaction on the lysed, reverse transcribed biological sample of cDNA to obtain an amplified analyzable sample of the cDNA; ~9

(e) performing a quantitative analysis to quantify the amplified analyzable sample of the cDNA. ~11

Thereby detecting, identifying and quantifying the spike proteins to indirectly detect, identify and quantify the target vaccine(s) and/or wild spike protein variant. ~13

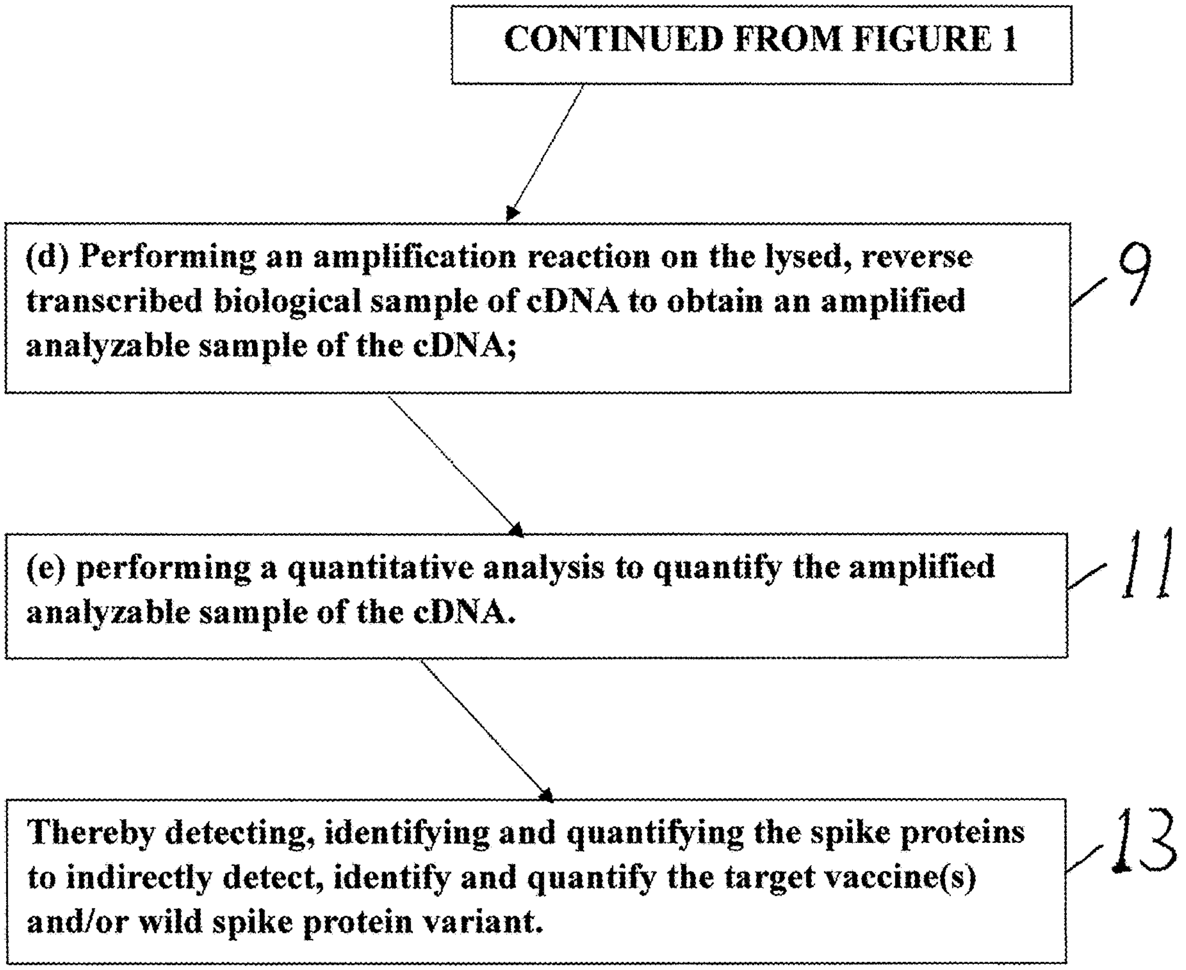

FIGURE 2

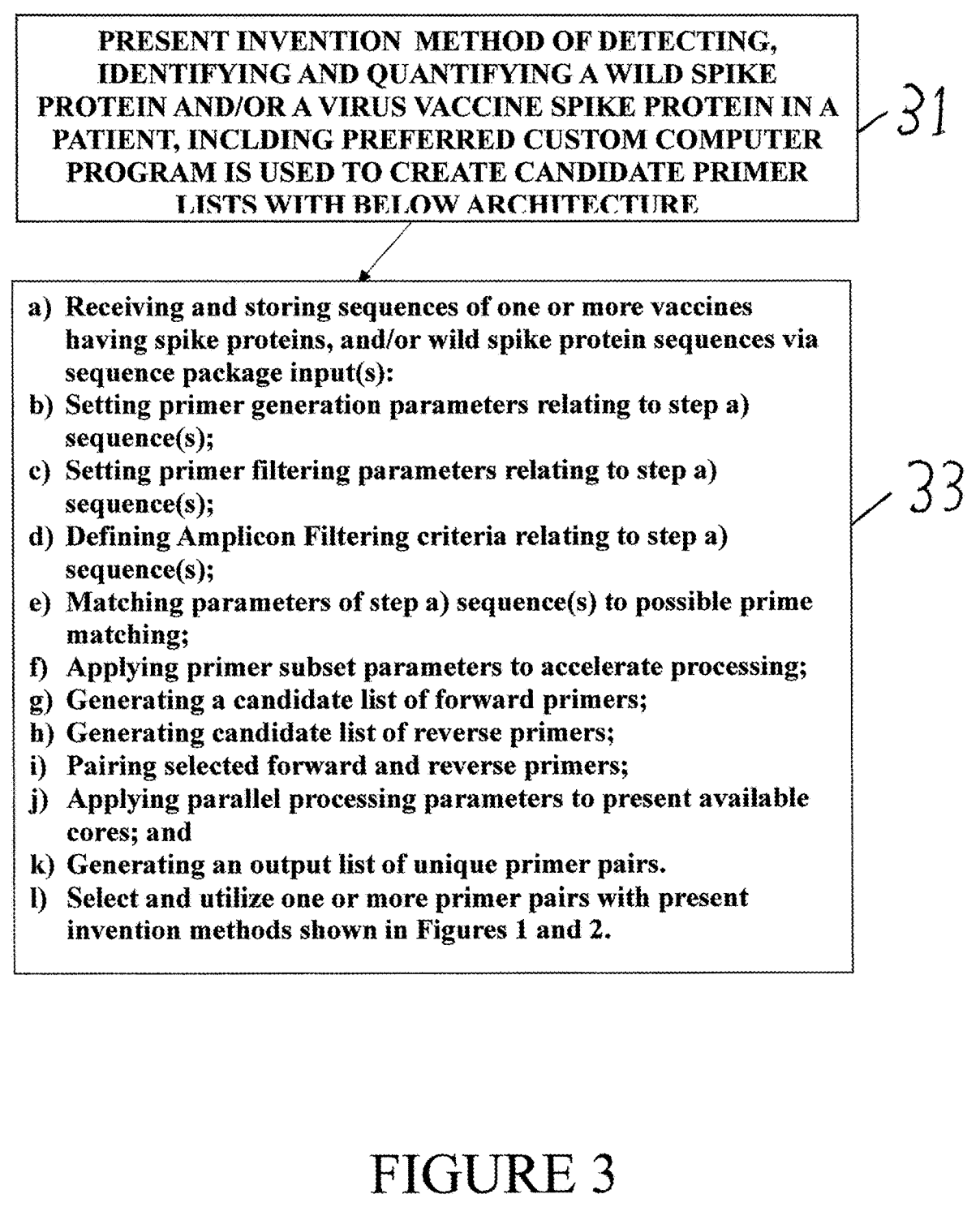

PRESENT INVENTION METHOD OF DETECTING, IDENTIFYING AND QUANTIFYING A WILD SPIKE PROTEIN AND/OR A VIRUS VACCINE SPIKE PROTEIN IN A PATIENT, INCLDING PREFERRED CUSTOM COMPUTER PROGRAM IS USED TO CREATE CANDIDATE PRIMER LISTS WITH BELOW ARCHITECTURE 31

33 a) Receiving and storing sequences of one or more vaccines having spike proteins, and/or wild spike protein sequences via sequence package input(s):
b) Setting primer generation parameters relating to step a) sequence(s);
c) Setting primer filtering parameters relating to step a) sequence(s);
d) Defining Amplicon Filtering criteria relating to step a) sequence(s);
e) Matching parameters of step a) sequence(s) to possible prime matching;
f) Applying primer subset parameters to accelerate processing;
g) Generating a candidate list of forward primers;
h) Generating candidate list of reverse primers;
i) Pairing selected forward and reverse primers;
j) Applying parallel processing parameters to present available cores; and
k) Generating an output list of unique primer pairs.
l) Select and utilize one or more primer pairs with present invention methods shown in Figures 1 and 2.

FIGURE 3

SEQUENCE LISTING

```
Sequence total quantity: 45
SEQ ID NO: 1            moltype = DNA  length = 20
FEATURE                 Location/Qualifiers
source                  1..20
                        mol_type = other DNA
                        organism = synthetic construct
SEQUENCE: 1
catgtctctg ggaccaatgg                                              20

SEQ ID NO: 2            moltype = DNA  length = 20
FEATURE                 Location/Qualifiers
source                  1..20
                        mol_type = other DNA
                        organism = synthetic construct
SEQUENCE: 2
gggactgggt cttcgaatct                                              20

SEQ ID NO: 3            moltype = DNA  length = 20
FEATURE                 Location/Qualifiers
source                  1..20
                        mol_type = other DNA
                        organism = synthetic construct
SEQUENCE: 3
agggactggg tcttcgaatc                                              20

SEQ ID NO: 4            moltype = DNA  length = 20
FEATURE                 Location/Qualifiers
source                  1..20
                        mol_type = other DNA
                        organism = synthetic construct
SEQUENCE: 4
gtagggactg ggtcttcgaa                                              20

SEQ ID NO: 5            moltype = DNA  length = 20
FEATURE                 Location/Qualifiers
source                  1..20
                        mol_type = other DNA
                        organism = synthetic construct
SEQUENCE: 5
agtagggact gggtcttcga                                              20

SEQ ID NO: 6            moltype = DNA  length = 20
FEATURE                 Location/Qualifiers
source                  1..20
                        mol_type = other DNA
                        organism = synthetic construct
SEQUENCE: 6
aagtagggac tgggtcttcg                                              20
```

```
SEQ ID NO: 7            moltype = DNA  length = 20
FEATURE                 Location/Qualifiers
source                  1..20
                        mol_type = other DNA
                        organism = synthetic construct
SEQUENCE: 7
ctgagggaga tcacgcacta                                                  20

SEQ ID NO: 8            moltype = DNA  length = 20
FEATURE                 Location/Qualifiers
source                  1..20
                        mol_type = other DNA
                        organism = synthetic construct
SEQUENCE: 8
cctgagggag atcacgcact                                                  20

SEQ ID NO: 9            moltype = DNA  length = 20
FEATURE                 Location/Qualifiers
source                  1..20
                        mol_type = other DNA
                        organism = synthetic construct
SEQUENCE: 9
ccctgaggga gatcacgcac                                                  20

SEQ ID NO: 10           moltype = DNA  length = 20
FEATURE                 Location/Qualifiers
source                  1..20
                        mol_type = other DNA
                        organism = synthetic construct
SEQUENCE: 10
accctgaggg agatcacgca                                                  20

SEQ ID NO: 11           moltype = DNA  length = 20
FEATURE                 Location/Qualifiers
source                  1..20
                        mol_type = other DNA
                        organism = synthetic construct
SEQUENCE: 11
aaccctgagg gagatcacgc                                                  20

SEQ ID NO: 12           moltype = DNA  length = 20
FEATURE                 Location/Qualifiers
source                  1..20
                        mol_type = other DNA
                        organism = synthetic construct
SEQUENCE: 12
tgttcctggt gctgctgccc                                                  20

SEQ ID NO: 13           moltype = DNA  length = 20
FEATURE                 Location/Qualifiers
source                  1..20
                        mol_type = other DNA
                        organism = synthetic construct
SEQUENCE: 13
acgccccggg tgaagctgtt                                                  20

SEQ ID NO: 14           moltype = DNA  length = 20
FEATURE                 Location/Qualifiers
source                  1..20
                        mol_type = other DNA
                        organism = synthetic construct
SEQUENCE: 14
tagacgcccc gggtgaagct                                                  20

SEQ ID NO: 15           moltype = DNA  length = 20
FEATURE                 Location/Qualifiers
source                  1..20
                        mol_type = other DNA
                        organism = synthetic construct
SEQUENCE: 15
agtagacgcc ccgggtgaag                                                  20

SEQ ID NO: 16           moltype = DNA  length = 20
FEATURE                 Location/Qualifiers
source                  1..20
                        mol_type = other DNA
                        organism = synthetic construct
SEQUENCE: 16
```

-continued

```
tagtagacgc cccgggtgaa                                              20

SEQ ID NO: 17          moltype = DNA  length = 20
FEATURE                Location/Qualifiers
source                 1..20
                       mol_type = other DNA
                       organism = synthetic construct
SEQUENCE: 17
gtagtagacg ccccgggtga                                              20

SEQ ID NO: 18          moltype = DNA  length = 20
FEATURE                Location/Qualifiers
source                 1..20
                       mol_type = other DNA
                       organism = synthetic construct
SEQUENCE: 18
tgtcggggta gtagacgccc                                              20

SEQ ID NO: 19          moltype = DNA  length = 20
FEATURE                Location/Qualifiers
source                 1..20
                       mol_type = other DNA
                       organism = synthetic construct
SEQUENCE: 19
ttgtcggggt agtagacgcc                                              20

SEQ ID NO: 20          moltype = DNA  length = 20
FEATURE                Location/Qualifiers
source                 1..20
                       mol_type = other DNA
                       organism = synthetic construct
SEQUENCE: 20
cttgtcgggg tagtagacgc                                              20

SEQ ID NO: 21          moltype = DNA  length = 20
FEATURE                Location/Qualifiers
source                 1..20
                       mol_type = other DNA
                       organism = synthetic construct
SEQUENCE: 21
ccttgtcggg gtagtagacg                                              20

SEQ ID NO: 22          moltype = DNA  length = 20
FEATURE                Location/Qualifiers
source                 1..20
                       mol_type = other DNA
                       organism = synthetic construct
SEQUENCE: 22
accttgtcgg ggtagtagac                                              20

SEQ ID NO: 23          moltype = DNA  length = 20
FEATURE                Location/Qualifiers
source                 1..20
                       mol_type = other DNA
                       organism = synthetic construct
SEQUENCE: 23
ttcttctggt ccccacagac                                              20

SEQ ID NO: 24          moltype = DNA  length = 20
FEATURE                Location/Qualifiers
source                 1..20
                       mol_type = other DNA
                       organism = synthetic construct
SEQUENCE: 24
tggtggtcag gttcacacac                                              20

SEQ ID NO: 25          moltype = DNA  length = 20
FEATURE                Location/Qualifiers
source                 1..20
                       mol_type = other DNA
                       organism = synthetic construct
SEQUENCE: 25
ctggtggtca ggttcacaca                                              20

SEQ ID NO: 26          moltype = DNA  length = 20
FEATURE                Location/Qualifiers
source                 1..20
                       mol_type = other DNA
                       organism = synthetic construct
```

-continued

```
SEQUENCE: 26
tctggtggtc aggttcacac                                          20

SEQ ID NO: 27          moltype = DNA  length = 20
FEATURE                Location/Qualifiers
source                 1..20
                       mol_type = other DNA
                       organism = synthetic construct
SEQUENCE: 27
gttctggtgg tcaggttcac                                          20

SEQ ID NO: 28          moltype = DNA  length = 20
FEATURE                Location/Qualifiers
source                 1..20
                       mol_type = other DNA
                       organism = synthetic construct
SEQUENCE: 28
gtgttctggt ggtcaggttc                                          20

SEQ ID NO: 29          moltype = DNA  length = 20
FEATURE                Location/Qualifiers
source                 1..20
                       mol_type = other DNA
                       organism = synthetic construct
SEQUENCE: 29
ctgtgttctg gtggtcaggt                                          20

SEQ ID NO: 30          moltype = DNA  length = 20
FEATURE                Location/Qualifiers
source                 1..20
                       mol_type = other DNA
                       organism = synthetic construct
SEQUENCE: 30
gctgtgttct ggtggtcagg                                          20

SEQ ID NO: 31          moltype = DNA  length = 20
FEATURE                Location/Qualifiers
source                 1..20
                       mol_type = other DNA
                       organism = synthetic construct
SEQUENCE: 31
agctgtgttc tggtggtcag                                          20

SEQ ID NO: 32          moltype = DNA  length = 20
FEATURE                Location/Qualifiers
source                 1..20
                       mol_type = other DNA
                       organism = synthetic construct
SEQUENCE: 32
cagctgtgtt ctggtggtca                                          20

SEQ ID NO: 33          moltype = DNA  length = 20
FEATURE                Location/Qualifiers
source                 1..20
                       mol_type = other DNA
                       organism = synthetic construct
SEQUENCE: 33
gcagctgtgt tctggtggtc                                          20

SEQ ID NO: 34          moltype = RNA  length = 3820
FEATURE                Location/Qualifiers
source                 1..3820
                       mol_type = other RNA
                       organism = synthetic construct
SEQUENCE: 34
tgtttgtttt tcttgtttta ttgccactag tctctagtca gtgtgttaat cttacaacca  60
gaactaatta ccccctgcat acactaattc tttcacacgt ggtgtttatt accctgacaa  120
agttttcaga tcctcagttt tacattcaac tcaggacttg ttcttacctt tcttttccaa  180
tgttacttgg ttccatgcta tacatgtctc tgggaccaat ggtactaaga ggtttgataa  240
ccctgtccta ccatttaatg atggtgttta ttttgcttcc actgagaagt ctaacataat  300
aagaggctgg atttttggta ctactttaga ttcgaagacc cagtccctac ttattgttaa  360
taacgctact aatgttgtta ttaaagtctg tgaatttcaa ttttgtaatg atccattttt  420
gggtgtttat taccacaaaa acaacaaaag ttggatggaa agtgagttca gagtttattc  480
tagtgcgaat aattgcactt ttgaatatgt ctctcagcct tttcttatgg accttgaagg  540
aaaacagggt aatttcaaaa atcttaggga atttgtgttt aagaatattg atggttattt  600
taaaatatat tctaagcaca cgcctattaa tttagtgcgt gatctccctc agggtttttc  660
ggctttagaa ccattggtag atttgccaat aggtattaac atcactaggt ttcaaacttt  720
acttgcttta catagaagtt atttgactcc tggtgattct tcttcaggtt ggacagctgg  780
tgctgcagct tattatgtgg gttatcttca acctaggact tttctattaa aatataatga  840
```

-continued

```
aaatggaacc attacagatg ctgtagactg tgcacttgac cctctctcag aaacaaagtg  900
tacgttgaaa tccttcactg tagaaaaagg aatctatcaa acttctaact ttagagtcca  960
accaacagaa tctattgtta gatttcctaa tattacaaac ttgtgccctt ttggtgaagt  1020
ttttaacgcc accagatttg catctgttta tgcttggaac aggaagagaa tcagcaactg  1080
tgttgctgat tattctgtcc tatataattc cgcatcattt tccactttta agtgttatgg  1140
agtgtctcct actaaattaa atgatctctg ctttactaat gtctatgcag attcatttgt  1200
aattagaggt gatgaagtca gacaaatcgc tccagggcaa actggaaaga ttgctgatta  1260
taattataaa ttaccagatg attttacagg ctgcgttata gcttggaatt ctaacaatct  1320
tgattctaag gttggtggta attataatta cctgtataga ttgtttagga agtctaatct  1380
caaacctttt gagagagata tttcaactga aatctatcag gccggtagca caccttgtaa  1440
tggtgttgaa ggttttaatt gttactttcc tttacaatca tatggtttcc aacccactaa  1500
tggtgttggt taccaaccat acagagtagt agtactttct tttgaacttc tacatgcacc  1560
agcaactgtt tgtggaccta aaaagtctac taatttggtt aaaaacaaat gtgtcaattt  1620
caacttcaat ggtttaacag gcacaggtgt tcttactgag tctaacaaaa agtttctgcc  1680
tttccaacaa tttggcagag acattgctga cactactgat gctgtccgtg atccacagac  1740
acttgagatt cttgacatta caccatgttc ttttggtggt gtcagtgtta taacaccagg  1800
aacaaatact tctaaccagg ttgctgttct ttatcaggat gttaactgca cagaagtccc  1860
tgttgctatt catgcagatc aacttactcc tacttggcgt gtttattcta caggttctaa  1920
tgtttttcaa acacgtgcag gctgtttaat aggggctgaa catgtcaaca actcatatga  1980
gtgtgacata cccattggtg caggtatatg cgctagttat cagactcaga ctaattctcc  2040
tcggcgggca cgtagtgtag ctagtcaatc catcattgcc tacactatgt cacttggtgc  2100
agaaaattca gttgcttact ctaataactc tattgccata cccacaaatt ttactattag  2160
tgttaccaca gaaattctac cagtgtctat gaccaagaca tcagtagatt gtacaatgta  2220
catttgtggt gattcaactg aatgcagcaa tcttttgttg caatatggca gtttttgtac  2280
acaattaaac cgtgctttaa ctggaatagc tgttgaacaa gacaaaaaca cccaagaagt  2340
tttgcacaa gtcaaacaaa tttacaaaac accaccaatt aaagattttg gtggttttaa  2400
tttttcacaa atattaccag atccatcaaa accaagcaag aggtcattta ttgaagatct  2460
acttttcaac aaagtgacac ttgcagatgc tggcttcatc aaacaatatg gtgattgcct  2520
tggtgatatt gctgctagag acctcatttg tgcacaaaag tttaacggcc ttactgtttt  2580
gccacctttg ctcacagatg aaatgattgc tcaatacact tctgcactgt tagcgggtac  2640
aatcacttct ggttggacct ttggtgcagg tgctgcatta caaataccat ttgctatgca  2700
aatggcttat aggtttaatg gtattggagt tacacagaat gttctctatg agaaccaaaa  2760
attgattgcc aaccaattta atagtgctat tggcaaaatt caagactcac tttcttccac  2820
agcaagtgca cttggaaaac ttcaagatgt ggtcaaccaa aatgcacaag ctttaaacac  2880
gcttgttaaa caacttagct ccaattttgg tgcaatttca agtgttttaa atgatatcct  2940
ttcacgtctt gacaaagttg aggctgaagt gcaaattgat aggttgatca caggcagact  3000
tcaaagtttg cagacatatg tgactcaaca attaattaga gctgcagaaa tcagagcttc  3060
tgctaatctt gctgctacta aaatgtcaga gtgtgtactt ggacaatcaa aaagagttga  3120
tttttgtgga aagggctatc atcttatgtc cttccctcag tcagcacctc atggtgtagt  3180
cttcttgcat gtgacttatg tccctgcaca agaaaagaac ttcacaactg ctcctgccat  3240
ttgtcatgat ggaaaagcac actttcctcg tgaaggtgtc tttgtttcaa atggcacaca  3300
ctggtttgta acacaaagga atttttatga accacaaatc attactacag acaacacatt  3360
tgtgtctggt aactgtgatg ttgtaatagg aattgtcaac aacacagttt atgatccttt  3420
gcaacctgaa ttagactcat tcaaggagga gttagataaa tattttaaga atcatacatc  3480
accagatgtt gatttaggtg acatctctgg cattaatgct tcagttgtaa acattcaaaa  3540
agaaattgac cgcctcaatg aggttgccaa gaatttaaat gaatctctca tcgatctcca  3600
agaacttgga aagtatgagc agtatataaa atggccatgg tacatttggc taggttttat  3660
agctggcttg attgccatag taatggtgac aattatgctt tgctgtatga ccagttgctg  3720
tagttgtctc aagggctgtt gttcttgtgg atcctgctgc aaatttgatg aagacgactc  3780
tgagccagtg ctcaaaggag tcaaattaca ttacacataa                        3820

SEQ ID NO: 35           moltype = RNA  length = 3828
FEATURE                 Location/Qualifiers
source                  1..3828
                        mol_type = other RNA
                        organism = synthetic construct
SEQUENCE: 35
atgttcgtgt tcctggtgct gctgcccctg gtgagcagcc agtgcgtgaa cctgaccacc  60
cggacccagc tgccaccagc ctacaccaac agcttcaccc ggggcgtcta ctaccccgac  120
aaggtgttcc ggagcagcgt cctgcacagc acccaggacc tgttcctgcc cttcttcagc  180
aacgtgacct ggttccacgc catccacgtg agcggcacca acggcaccaa gcggttcgac  240
aaccccgtgc tgcccttcaa cgacggcgtg tacttcgcca gcaccgagaa gagcaacatc  300
atccggggct ggatcttcgg caccaccctg gacagcaaga cccagagcct gctgatcgtg  360
aataacgcca ccaacgtggt gatcaaggtg tgcgagttcc agttctgcaa cgacccccttc  420
ctgggcgtgt actaccacaa gaacaacaag agctggatgg agagcgagtt ccgggtgtac  480
agcagcgcca acaactgcac cttcgagtac gtgagccagc ccttcctgat ggacctggag  540
ggcaagcagg gcaacttcaa gaacctgcgg gagttcgtgt tcaagaacat cgacggctac  600
ttcaagatct acagcaagca caccccaatc aacctggtgc gggatctgcc ccagggcttc  660
tcagccctgg agcccctggt ggacctgccc atcggcatca acatcacccg gttccagacc  720
ctgctggccc tgcaccggag ctacctgacc ccaggcgaca gcagcagcgg gtggacagca  780
ggcgcggctg cttactacgt gggctacctg cagccccgga ccttcctgct gaagtacaac  840
gagaacggca ccatcaccga cgccgtggac tgcgccctgg accctctgag cgagaccaag  900
tgcaccctga agagcttcac cgtggagaag ggcatctacc agaccagcaa cttccgggtg  960
cagcccaccg agagcatcgt gcggttcccc aacatcacca acctgtgccc cttcggcgag  1020
gtgttcaacg ccacccggtt cgccagcgtg tacgcctgga accggaagcg gatcagcaac  1080
tgcgtggccg actacagcgt gctgtacaac agcgccagct tcagcacctt caagtgctac  1140
ggcgtgagcc ccaccaagct gaacgacctg tgcttcacca acgtgtacgc cgacagcttc  1200
gtgatccgtg gcgacgaggt gcggcagatc gcacccggcc agacaggcaa gatcgccgac  1260
tacaactaca agctgcccga cgacttcacc ggctgcgtga tcgcctggaa cagcaacaac  1320
```

-continued ctcgacagca aggtgggcgg caactacaac tacctgtacc ggctgttccg gaagagcaac 1380
ctgaagccct tcgagcggga catcagcacc gagatctacc aagccggctc cacccccttgc 1440
aacggcgtgg agggcttcaa ctgctacttc cctctgcaga gctacggctt ccagcccacc 1500
aacggcgtgg gctaccagcc ctaccgggtg gtggtgctga gcttcgagct gctgcacgcc 1560
ccagccaccg tgtgtggccc caagaagagc accaacctgg tgaagaacaa gtgcgtgaac 1620
ttcaacttca acggccttac cggcaccggc gtgctgaccg agagcaacaa gaaattcctg 1680
ccctttcagc agttcggccg ggacatcgcc gacaccaccg acgctgtgcg ggatccccag 1740
accctggaga tcctggacat caccccttgc agcttcggcg gcgtgagcgt gatcacccca 1800
ggcaccaaca ccagcaacca ggtggccgtg ctgtaccagg acgtgaactg caccgaggtg 1860
cccgtggcca tccacgccga ccagctgaca cccacctggc gggtctacag caccggcagc 1920
aacgtgttcc agacccgggc cggttgcctg atcggcgccg agcacgtgaa caacagctac 1980
gagtgcgaca tccccatcgg cgccggcatc tgtgccagct accagaccca gaccaattca 2040
ccccggaggg caaggagcgt ggccagccag agcatcatcg cctacaccat gagcctgggc 2100
gccgagaaca gcgtggccta cagcaacaac agcatcgcca tccccaccaa cttcaccatc 2160
agcgtgacca ccgagattct gcccgtgagc atgaccaaga ccagcgtgga ctgcaccatg 2220
tacatctgcg gcgacagcac cgagtgcagc aacctgctgc tgcagtacgg cagcttctgc 2280
acccagctga accgggccct gaccggcatc gccgtggagc aggacaagaa cacccaggag 2340
gtgttcgccc aggtgaagca gatctacaag acccctccca tcaaggactt cggcggcttc 2400
aacttcagcc agatcctgcc cgaccccagc aagcccagca agcggagctt catcgaggac 2460
ctgctgttca acaaggtgac cctagccgac gccggcttca tcaagcagta cggcgactgc 2520
ctcggcgaca tagccgcccg ggacctgatc tgcgcccaga agttcaacgg cctgaccgtg 2580
ctgcctcccc tgctgaccga cgagatgatc gcccagtaca ccagcgccct gttagccgga 2640
accatcacca gcggctggac tttcggcgct ggagccgctc tgcagatccc cttcgccatg 2700
cagatggcct accggttcaa cggcatcggc gtgacccaga acgtgctgta cgagaaccag 2760
aagctgatcg ccaaccagtt caacagcgcc atcggcaaga tccaggacag cctgagcagc 2820
accgctagcg ccctgggcaa gctgcaggac gtggtgaacc agaacgccca ggccctgaac 2880
accctggtga agcagctgag cagcaacttc ggcgccatca gcagcgtgct gaacgacatc 2940
ctgagccggc tggaccctcc cgaggccgag gtgcagatcg accggctgat cactggccgg 3000
ctgcagagcc tgcagaccta cgtgacccag cagctgatcc gggccgccga gattcgggcc 3060
agcgccaacc tggccgccac caagatgagc gagtgcgtgc tgggccagag caagcgggtg 3120
gacttctgcg gcaagggcta ccacctgatg agctttcccc agagcgcacc ccacggagtg 3180
gtgttcctgc acgtgaccta cgtgcccgcc caggagaaga acttcaccac cgccccagcc 3240
atctgccacg acggcaaggc ccactttccc cgggagggcg tgttcgtgag caacggcacc 3300
cactggttcg tgacccagcg gaacttctac gagccccaga tcatcaccac cgacaacacc 3360
ttcgtgagcg gcaactgcga cgtggtgatc ggcatcgtga acaacaccgt gtacgatccc 3420
ctgcagcccg agctggacag cttcaaggag gagctggaca agtacttcaa gaatcacacc 3480
agccccgacg tggacctggg cgacatcagc ggcatcaacg ccagcgtggt gaacatccag 3540
aaggagatcg atcggctgaa cgaggtggcc aagaacctga acgagagcct gatcgacctg 3600
caggagctgg gcaagtacga gcagtacatc aagtggccct ggtacatctg gctgggcttc 3660
atcgccggcc tgatcgccat cgtgatggtg accatcatgc tgtgctgcat gaccagctgc 3720
tgcagctgcc tgaagggctg ttgcagctgc ggcagctgct gcaagttcga cgaggacgac 3780
agcgagcccg tgctgaaggg cgtgaagctg cactacacct gataatag 3828

SEQ ID NO: 36 moltype = RNA length = 3720
FEATURE Location/Qualifiers
source 1..3720
mol_type = other RNA
organism = synthetic construct
SEQUENCE: 36
accagaacac agctgcctcc agcctacacc aacagcttta ccagaggcgt gtactacccc 60
gacaaggtgt tcagatccag cgtgctgcac tctacccagg acctgttcct gcctttcttc 120
agcaacgtga cctggttcca cgccatccac gtgtccggca ccaatggcac caagagattc 180
gacaaccccg tgctgccctt caacgacggg gtgtactttg ccagcaccga gaagtccaac 240
atcatcagag gctggatctt cggcaccaca ctggacagca agacccagag cctgctgatc 300
gtgaacaacg ccaccaacgt ggtcatcaaa gtgtgcgagt tccagttctg caacgacccc 360
ttcctgggcg tctactacca caagaacaac aagagctgga tggaaagcga gttccgggtg 420
tacagcagcg ccaacaactg caccttcgag tacgtgtccc agcctttcct gatggacctg 480
gaaggcaagc agggcaactt caagaacctg cgcgagttcg tgtttaagaa catcgacggc 540
tacttcaaga tctacagcaa gcacaccccc atcaacctcg tgcgggatct gcctcagggc 600
ttctctgctc tggaacccct ggtggatctg cccatcggca tcaacatcac ccggtttcag 660
acactgctgg ccctgcacag aagctacctg acacctggcg atagcagcag cggatggaca 720
gctggtgccg ccgcttacta tgtgggctac ctgcagccta gaaccttcct gctgaagtac 780
aacgagaacg gcaccatcac cgacgccgtg gattgtgctc tggatcctct gagcgagaca 840
aagtgcaccc tgaagtcctt caccgtggaa aagggcatct accagaccag caacttccgg 900
gtgcagccca ccgaatccat cgtgcggttc cccaatatca ccaatctgtg ccccttcggc 960
gaggtgttca atgccaccag attcgcctct gtgtacgcct ggaaccggaa gcggatcagc 1020
aattgcgtgg ccgactactc cgtgctgtac aactccgcca gcttcagcac cttcaagtgc 1080
tacggcgtgt cccctaccaa gctgaacgac ctgtgnnnnn nnnnnnnnnn nnnnnnnnnn 1140
nnnnnnnnnn nnnnnnnnnn nnnnnnnnnn nnnnnnnnnn nnnnnnnnnn nnnnnnnnnn 1200
nnnnnnnnnn nnnnnnnnnn nnnnnnnnnn nnnnnnnnnn nnnnnnnctg gaacagcaac 1260
aacctggact ccaaagtcgg cggcaactac aattacctgt accggctgtt ccggaagtcc 1320
aatctgaagc ccttcgagcg ggacatctcc accgagatct atcaggccgg cagcacccct 1380
tgtaacggcg tggaaggctt caactgctac ttcccactgc agtcctacgg ctttcagccc 1440
acaaatggcg tgggctatca gccctacaga gtggtggtgc tgagcttcga actgctnnnn 1500
nnnnnnnnnn nnnnnnnnnn nnnnnnnnnn nnnnnnnnnn nnnnnnnnnn nnnnnnnnnn 1560
nnnnnnnnnn nnnnnnnnnn nnnnnnnnnn nnnnnnnnnn nnnnnnnnnn nnnnnnnnnn 1620
nnnnnnnnnn nnnnnnnnnn nnnnnnnnnn nnnnnnnnnn nnnnnnnnnn nnnnnnnnnn 1680
nnnnnnnnnn nnnnnnnnnn nnnnnnnnnn nnnnnnnnnn nnnnnnnnnn nnnnnnnnnn 1740
nnnnnnnnnn nnnncagcaa tcaggtggca gtgctgtacc aggacgtgaa ctgtaccgaa 1800

-continued

```
gtgcccgtgg ccattcacgc cgatcagctg acacctacat ggcgggtgta ctccaccggc  1860
agcaatgtgt ttcagaccag agccggctgt ctgatcggag ccgagcacgt gaacaatagc  1920
tacgagtgcg acatccccat cggcgctgga atctgcgcca gctaccagac acagacaaac  1980
agccctcgga gagccagaag cgtggccagc cagagcatca ttgcctacac aatgtctctg  2040
ggcgccgaga acagcgtggc ctactccaac aactctatcg ctatccccac caacttcacc  2100
atcagcgtga ccacagagnn nnnnnnnnnn nnnnnnncca agaccagcgt ggactgcacc  2160
atgtacatct gcggcgattc caccgagtgc tccaacctgc tgctgcagta cggcagcttc  2220
tgcacccagc tgaatagagc cctgacaggg atcgccgtgg aacaggacaa gaacacccaa  2280
gaggtgttcg cccaagtgaa gcagatctac aagacccctc ctatcaagga cttcggcggc  2340
ttcaatttca gccagattct gcccgatcct agcaagccca gcaagcggag cttcatcgag  2400
gacctgctgt tcaacaaagt gacactggcc gacgccggct tcatcaagca gtatggcgat  2460
tgtctgggcg acattgccgc cagggatctg atttgcgccc agaagtttaa cggactgaca  2520
gtgctgcctc ctctgctgac cgatgagatg atcgcccagt acacatctgc cctgctggcc  2580
ggcacaatca caagcggctg gacatttgga gcaggcgccg ctctgcagat cccctttgct  2640
atgcagatgg cctaccggtt caacggcatc ggagtgaccc agaatgtgct gtacgagaac  2700
cagaagctga tcgccaacca gttcaacagc gccatcggca agatccagga cagcctgagc  2760
agcacagcaa gcgccctggg aaagctgcag gacgtggtca accagaatgc ccaggcactg  2820
aacaccctgg tcaagcagct gtcctccaac ttcggcgcca tcagctctgt gctgaacgat  2880
atcctgagca gactggaccc tcctgaggcc gaggtgcaga tcgacagact gatcacaggc  2940
agactgcaga gcctccagac atacgtgacc cagcagctga tcagagccgc cgagattaga  3000
gcctctgcca atctggccgc caccaagatg tctgagtgtg tgctgggcca gagcaagaga  3060
gtggactttt gcggcaaggg ctaccacctg atgagcttcc ctcagtctgc cnnnnacggc  3120
gtggtgtttc tgcacgtgac atatgtgccc gctcaagaga agaatttcac caccgctcca  3180
gccatctgcc acgacggcaa agcccacttt cctagagaag gcgtgttcgt gtccaacggc  3240
acccattggt tcgtgacaca gcggaannnn nnnnnnnnnn nnnnnntcac caccgacaac  3300
accttcgtgt ctggcaactg cgacgtcgtg atcggcattg tgaacaatac cgtgtacgac  3360
cctctgcagc ccgagctgga cagcttcaaa gaggaactgg acaagtactt taagaaccac  3420
acaagccccg acgtggacct gggcgatatc agcggaatca atgccagcgt cgtgaacatc  3480
cagaaagaga tcgaccggct gaacgaggtg gccaagaatc tgaacgagag cctgatcgac  3540
ctgcaagaac tggggaagta cgagcagtac atcaagtggc cctggtacat ctggctgggc  3600
tttatcgccg gactgattgc catcgtgatg gtcacaatca tgctgtgttg catgaccagc  3660
tgctgtagct gcctgaaggg ctgttgtagc tgtggcagct gctgcaagtt cgacgaggac  3720
```

```
SEQ ID NO: 37          moltype = RNA  length = 29
FEATURE                Location/Qualifiers
source                 1..29
                       mol_type = other RNA
                       organism = synthetic construct
SEQUENCE: 37
tgctagttat tgaggcttaa cagggagga                                   29

SEQ ID NO: 38          moltype = RNA  length = 22
FEATURE                Location/Qualifiers
source                 1..22
                       mol_type = other RNA
                       organism = synthetic construct
SEQUENCE: 38
gagtggaagg tttgtccgtt tg                                          22

SEQ ID NO: 39          moltype = RNA  length = 22
FEATURE                Location/Qualifiers
source                 1..22
                       mol_type = other RNA
                       organism = synthetic construct
SEQUENCE: 39
cttgtccatg gaaggtgaca tg                                          22

SEQ ID NO: 40          moltype = RNA  length = 19
FEATURE                Location/Qualifiers
source                 1..19
                       mol_type = other RNA
                       organism = synthetic construct
SEQUENCE: 40
acctacgctg accttcgtg                                              19

SEQ ID NO: 41          moltype = RNA  length = 19
FEATURE                Location/Qualifiers
source                 1..19
                       mol_type = other RNA
                       organism = synthetic construct
SEQUENCE: 41
gtgctgtttg tgctgctct                                              19

SEQ ID NO: 42          moltype = RNA  length = 18
FEATURE                Location/Qualifiers
source                 1..18
                       mol_type = other RNA
                       organism = synthetic construct
SEQUENCE: 42
```

-continued

```
cgtcttcagg ttggtcac                                                   18

SEQ ID NO: 43          moltype = RNA  length = 21
FEATURE                Location/Qualifiers
source                 1..21
                       mol_type = other RNA
                       organism = synthetic construct
SEQUENCE: 43
acctggtgtt gctatctctg c                                               21

SEQ ID NO: 44          moltype = RNA  length = 26
FEATURE                Location/Qualifiers
source                 1..26
                       mol_type = other RNA
                       organism = synthetic construct
SEQUENCE: 44
acaggtacgt taatagttaa tagcgt                                          26

SEQ ID NO: 45          moltype = RNA  length = 21
FEATURE                Location/Qualifiers
source                 1..21
                       mol_type = other RNA
                       organism = synthetic construct
SEQUENCE: 45
ctgacttgag cttgtcttct g                                               21
```

METHODS OF DETECTING, IDENTIFYING AND QUANTIFYING WILD SPIKE PROTEIN AND COVID VACCINE SPIKE PROTEINS

REFERENCE TO RELATED APPLICATIONS

This application has no pending or previously filed or otherwise related applications.

REFERENCE TO SEQUENCE LISTING

This application includes an electronically submitted sequence listing in .XML format. The .XML file was created on Mar. 26, 2025, as amended on Oct. 17, 2025, contains a sequence listing entitled "KTR101A.xml" and is 51,000 bytes in size. The sequence listing contained in this .XML file is part of the specification and is hereby incorporated by reference herein in its entirety.

BACKGROUND OF INVENTION a. Field of Invention

The present invention is believed to create a new field of endeavor. Vaccines are intended to prevent infection by stimulating the immune system to recognize and respond to molecular components of a pathogen without causing disease. Vaccines typically contain inactivated, attenuated, or molecular components of the virus or bacteria that the vaccine is intended to prevent. After vaccination, the immune system generates antibodies and other components that prepare the immune system to react quickly and effectively when exposed to live virus or bacteria in the future, preventing or reducing the severity of illness.

During the COVID-19 pandemic vaccines were rapidly developed and deployed under emergency use authorizations to curb viral spread. COVID-19 vaccines work by training the immune system to recognize and fight the SARS-CoV-2 virus, primarily by targeting its spike protein—the key structure the virus uses to enter human cells. mRNA vaccines, like those from Pfizer-BioNTech and Moderna, contain genetic instructions for cells to produce a modified version of the spike protein. This modified spike protein is stabilized in a prefusion state, preventing it from changing shape as it would during infection, thereby enhancing immune recognition. Once the body produces modified spike protein, the immune system mounts a response, generating antibodies and memory cells that provide protection against future infections. Adenovirus vector vaccines, such as from AstraZeneca and Johnson & Johnson, use a similar principle but deliver nucleic acid coding for the modified spike protein instructions via a viral vector instead of mRNA. These design modifications to the spike protein were intended to enhance vaccine effectiveness and durability while reducing the risk of adverse immune responses.

During natural infection, spike protein on wild-type virions allows virions to bind and enter host cells. Once inside the cell, virions replicate themselves leading to virus spread within tissues and cellular dysfunction that typically manifests as clinical disease. Additionally, it has been shown that wild-type spike protein independent of virions can cause endothelia dysfunction, aberrant blood clotting, inflammation, and tissue damage. Modified spike proteins utilized in vaccines were engineered in an attempt to reduce the intrinsic pathogenicity of the spike protein. Despite these efforts, some vaccines were removed from clinical use due to immediate safety concerns—such as dangerous post-vaccine blood clotting. Overall, public health authorities approved and deployed the vaccines without long-term safety or efficacy data, believing that they had a favorable risk/reward profile in the context of the emergent pandemic.

Since various vaccine approvals and deployment, many practitioners have observed not only minor side effects, but very alarming side effects in vaccinated patients, which may or may not be attributed to the vaccine. These range from acceptable side effects to chronic and life-threatening illnesses and diseases, such as various forms of cancer (collectively "negative effects"). While correlations between vaccination and diseases exist, a causal link between modified spike protein and disease has been difficult to test. A key challenge has been the absence of an analytical method that can discriminate between nucleic acid coding for wild type or modified spike protein. Thus, the present invention is uniquely directed specifically to detecting, identifying and quantifying wild spike protein and vaccine spike protein in human test samples.

b. Description of Related Art

The following patents are representative of prior art of interest to the present invention:

United States Published Patent Application No. US 20220356535 A1, by inventors Sriram Kosuri et al for PATHOGEN DIAGNOSTIC TEST, filed on 2021 Apr. 5 and published on 2022 Nov. 10, describes a method of diagnosing an individual with a pathogen infection. The method uses PCR and sequencing to achieve highly specific and sensitive detection of viral genomes from biological samples. Features of the methods described herein that allow for such detection include: 1) reverse transcription and/or amplification directly in a lysis agent or after lysis conditions without purification or isolation; 2) the presence of a synthetic nucleic acid that is able to amplified by oligonucleotide primers that target a viral sequence of interest, but that comprises a different distinguishable intervening sequence, spiked into the reverse transpiration amplification mixture; and allowing for more accurate quantification and lower thresholds of detection; 3) indexes to allow multiplexing by next generation sequencing. In certain embodiments, the pathogen is a viral infection (e.g., SARS-CoV-2). The methods herein can also be multiplexed to allow more than one viral pathogen to be detected (e.g., SARS-CoV-2 and influenza A or B or both). Thus, this prior art establishes the use of PCR for identification and quantification of viral genomes from biological samples.

United States Published Patent Application No. US 20240339174 A1 by inventors Alexander Muik et al. for TECHNOLOGIES FOR EARLY DETECTION OF VARIANTS OF INTEREST, filed on 2022 May 4 and published on 2024 Oct. 10, describes detection of COVID-19 virus mutations. The ongoing COVID-19 pandemic is leading to the discovery of hundreds of novel SARS-CoV-2 variants on a near daily basis. While most variants do not impact the course of the pandemic, some variants pose significantly increased risk when the acquired mutations allow better evasion of antibody neutralization in previously infected or vaccinated subjects, or increased transmissibility. Viral mutations that allow an infection to escape from recognition by neutralizing antibodies are a concern in the development of effective therapies for infections, for example, SARS-CoV-2 infections. As new sequences continue to naturally emerge, the potential for generation of variants that are both highly transmissible and highly immune resistant creates a significant challenge for prevention and/or treatment of such infections. Experimental techniques that perform causal escape profiling of all single-residues in a viral protein generally require substantial effort to profile even a single viral strain, and testing the escape potential of many combinatorial mutations in many viral strains remains infeasible. While transmissibility and immune escape potential of a given variant can be assessed experimentally, such methods are typically resource intensive and time consuming and cannot be scaled to properly address the multitude of emergent variants. The prior art disclosure, among other things, provides technologies for identifying, characterizing, and/or monitoring sequences of a variant of a reference infectious agent (e.g., but not limited to viral variants, for example in some embodiments SARS-CoV-2 variants) for transmissibility factors and/or immune escape potential, and/or for detecting and/or monitoring variants in environmental or biological samples, and/or for designing, preparing, and/or administering vaccines for such variants. PCR techniques are described.

United States Published Patent Application No. US 20240385189 A1 by inventors Raymond Alvarez and Rebecca Brachman for COMPOSITIONS AND METHODS FOR DETERMINING HUMORAL IMMUNE RESPONSES AGAINST SEASONAL CORONAVIRUSES AND PREDICTING EFFICIENCY OF SARS-COV-2 SPIKE TARGETING, COVID-19 DISEASE SEVERITY, AND PROVIDING INTERVENTIONS filed on 2022 Sep. 9 and published on 2024 Nov. 21 relates in part to the discovery that anti-spike IgG early in SARS-CoV-2 infection may be attributable to the amplification of humoral memory responses against seasonal human coronavirus (hCoVs) in severe COVID-19 patients. This disclosure provides characterization of anti-spike IgG from a cohort of non-hospitalized convalescent individuals with a spectrum of COVID-19 severity, as well as a cohort of ICU-hospitalized individuals with acute, severe COVID-19. The results demonstrate that anti-spike IgG levels positively correlated with disease severity, higher IgG cross-reactivity against beta-coronaviruses (SARS-CoV-1 and OC43), and higher levels of proinflammatory Fc gamma receptor 2a and 3a (FcTR2a & FcTR3a) activation. In examining the levels of IgG targeting beta-coronavirus cross-reactive epitopes and disease severity, the inventors of this prior art observed a positive correlation with the levels of IgG targeting the S2'FP region, and an inverse correlation with the levels of IgG targeting two epitopes around the heptad repeat (HR) 2 region. In comparing the levels of IgG targeting non-conserved epitopes, we observed that only one of three non-conserved immunodominant epitopes correlated with disease severity. As described in greater detail below, the levels of IgG targeting the RBD region were inversely correlated with severity. Targeting of the RBD and HR2 regions have both been shown to mediate SARS CoV-2 neutralization. The disclosure thus demonstrates that, aside from Ab targeting of the RBD region, humoral memory responses against seasonal beta-coronaviruses are an important factor in dictating COVID-19 severity, with anti-HR2-dominant Ab profiles representing protective memory responses, while an anti-S2'FP dominant Ab profiles indicating deleterious recall responses. Though these profiles are masked in whole antigen profiling, data presented in this disclosure indicate that distinct Ab memory responses are detectable with epitope targeting analysis. In this regard, the description below expands on these discoveries to provide improved predictive approaches that involve determining ratios of antibodies that bind to particular combinations of peptides, including but not limited to composite antibody profile ratios. The disclosure thus provides compositions and methods for predicting severity of SARS-CoV-2 infections (primary and reinfections), and for use in predicting vaccine efficacy in individuals with different dominant antibody epitope profiles, as well as tailoring individual treatment recommendations and treatments based on the antibody profiles. PCR techniques are described.

In a published article in *Biomedicines* received May 25, 2022, and published Jun. 28, 2022, titled "Vaccine mRNA Can Be Detected in Blood at 15 Days Post-Vaccination" by Tudor Emanuel Fertig et al, states in part: "COVID-19 mRNA vaccines effectively reduce incidence of severe disease, hospitalization and death. The biodistribution and pharmacokinetics of the mRNA-containing lipid nanoparticles (LNPs) in these vaccines are unknown in humans. In this study, we used qPCR to track circulating mRNA in blood at different time-points after BNT162b2 vaccination in a small cohort of healthy individuals. We found that vaccine-associated synthetic mRNA persists in systemic circulation for at least 2 weeks. Furthermore, we used transmission electron microscopy (TEM) to investigate SARS-CoV-2 spike protein expression in human leukemic cells and in primary mononuclear blood cells treated in vitro with the BNT162b2 vaccine. TEM revealed morphological changes suggestive of LNP uptake, but only a small fraction of K562 leukemic cells presented spike-like structures at the cell surface, suggesting reduced levels of expression for these specific phenotypes." This reference shows in section 2.2 that reverse transcription qPCR was used, followed by transmission electron microscopy (direct test detection). The studies were conducted on specimens 15 days post-vaccination, with detection results positive. There is no indication that direct testing is used or should be used, no indication or suggestion of detection for correlation with potentially disastrous vaccine side effects, and no suggestion that these tests should be implemented months or years after vaccination or vaccination exposure.

Notwithstanding the prior art, the present invention is neither taught nor rendered obvious thereby.

SUMMARY OF THE INVENTION

The present invention is a method of detecting, identifying and quantifying at least one nucleic acid encoding spike protein selected from the group consisting of wild type spike protein and a virus vaccine spike protein in a patient to indirectly detect a vaccine or a wild spike protein variant in said patient, which comprises: (a) providing a biological sample from said patient, wherein said biological sample may include at least one nucleic acid encoding a spike protein selected from the group consisting of wild type spike protein and a vaccine spike protein with at least one corresponding synthetic RNA, wherein a sequence of said at least one corresponding synthetic RNA differs from naturally occurring nucleic acid sequences; (b) isolating RNA from said biological sample by producing a lysed biological sample of RNA; (c) performing a reverse transcription polymerase chain reaction on said lysed biological sample of RNA to obtain a lysed, reverse transcribed biological sample of cDNA utilizing at least one primer set from the group consisting of VAXX-specific primers, wild type spike protein specific primers and combinations thereof and at least one probe set selected from the group consisting of VAXX-specific probes, wild type spike protein specific probes and combinations thereof; (d) performing an amplification reaction on said lysed, reverse transcribed biological sample of cDNA to obtain an amplified analyzable sample of said cDNA; and, (e) performing a quantitative analysis to quantify said amplified analyzable sample of said cDNA, and thereby detect and identify and quantify said at least one spike protein.

In some present invention preferred embodiments, the steps further include (f) utilizing a computer having a central processing unit, with a computer primer listing computer program established in said computer central processing unit to define at least one primer set from the group consisting of VAXX-specific primers, wild type spike protein specific primers and combinations thereof, said computer program designed to generate a list of said at least one primer set based on inputs of sequence data of one or more sequences selected from the group consisting of wild type spike protein and a vaccine spike protein, and combinations thereof, and operating said program to create a list of primer pairs corresponding to said group consisting of wild type spike protein and a vaccine spike protein, creating at least one corresponding primer pair, and utilizing said primer pair in said step (c) above, to thereby detect and identify and quantify said at least one spike protein and thus indirectly detect and identify and quantify the target vaccine or wild spike protein variant. The detailed architecture of such programs is described below.

In some other preferred embodiments, the reverse transcription polymerase reaction and amplification reaction on said lysed, reverse transcribed biological sample is performed with a set of Coronavirus vaccine primers specific for a Coronavirus vaccine nucleic acid sequence, wherein said set of Coronavirus vaccine primers amplify said Coronavirus vaccine nucleic acid sequence and corresponding Coronavirus vaccine synthetic RNA; and sequencing said amplified biological sample using next generation sequencing, further providing a positive identification for Coronavirus vaccine if sequence reads from said Coronavirus vaccine nucleic acid sequence are detected. The target Coronavirus vaccine may be a SARS-Cov-2 vaccine; may be a COVID-19 vaccine.

In some embodiments, the lysing of said biological sample utilizes thermal lysis, by heating said biological sample to a temperature of at least 50° C.

In some embodiments, the present invention includes wherein said reverse transcription polymerase reaction and amplification reaction on said lysed, reverse transcribed biological sample is performed with a set of wild type spike protein primers specific for wild type spike protein nucleic acid sequence, wherein said set of wild type spike protein primers amplify said wild type spike protein vaccine nucleic acid sequence and corresponding wild type spike protein synthetic RNA; and sequencing said amplified biological sample using next generation sequencing and providing a positive identification for wild type spike protein if sequence reads from said wild type spike protein nucleic acid sequence are detected.

In some preferred embodiments, the method is a multiplexing method that includes the use of probes and primers for at least two different target vaccines to indirectly detect, identify and quantify said at least two different vaccine targets. Alternatively, the present invention method is a multiplexing method that includes the use of probes and primers for at least one target vaccine and one wild spike protein variant to indirectly detect, identify and quantify said at least one vaccine target and one wild spike protein variant.

In some present invention preferred embodiments, said reverse transcription polymerase reaction is real time reverse transcription polymerase reaction. Preferred is wherein said real time reverse transcription polymerase reaction includes the use of probes selected from the group consisting of TaqMan fluorescent probes, SYBR fluorescent probes, molecular beacon fluorescent probes, and scorpion fluorescent probes. In some embodiments, said real time reverse transcription polymerase reaction includes quantitative analysis based on light emitting intensity.

In some specially preferred embodiments, the present invention involves multiplexing, i.e., using the process to simultaneously detect a plurality of nucleic acids of the targets. Thus, in some preferred embodiments, said method is a multiplexing method that includes the use of probes and primers for at least two different target vaccines to indirectly detect, identify and quantify said at least two different vaccine targets. In other preferred embodiments, said method is a multiplexing method that includes the use of probes and primers for at least one target vaccine and one wild type spike protein variant to indirectly detect, identify and quantify said at least one vaccine target and one wild type spike protein variant.

Various unique reaction mixtures are also within the scope of the present invention. Thus, the present invention includes a reaction mixture for determining the presence or absence of a viral vaccine nucleic acid spike protein in a biological sample, comprising: a synthetic nucleic acid of a COVID-19 vaccine, at least a portion of a biological sample from an individual, and one or more enzyme or reagents sufficient to amplify said vaccine nucleic acid in said biological sample from said individual, if present. It also includes a reaction mixture for determining the presence or absence of nucleic acid wild spike protein in a biological sample, comprising: a synthetic nucleic acid of a wild spike protein, at least a portion of a biological sample from an individual, and one or more enzyme or reagents sufficient to amplify said nucleic acid in said biological sample from said individual, if present.

BRIEF DESCRIPTION OF THE DRAWINGS

The accompanying drawings, which are included to provide a further understanding of the invention and are incorporated in and constitute a part of this specification, illustrate preferred embodiments of the invention and together with the detailed description, explain the principles of the invention. In the drawings:

FIG. 1 is a block diagram showing some of the features of one embodiment of a Present Invention Method;

FIG. 2 is a block diagram showing some of the remaining features of the Present Invention Method shown in FIG. 1;

FIG. 3 is a block diagram showing some of the features of Present Invention Preferred Method;

DETAILED DESCRIPTION OF THE INVENTION

Figure 4:
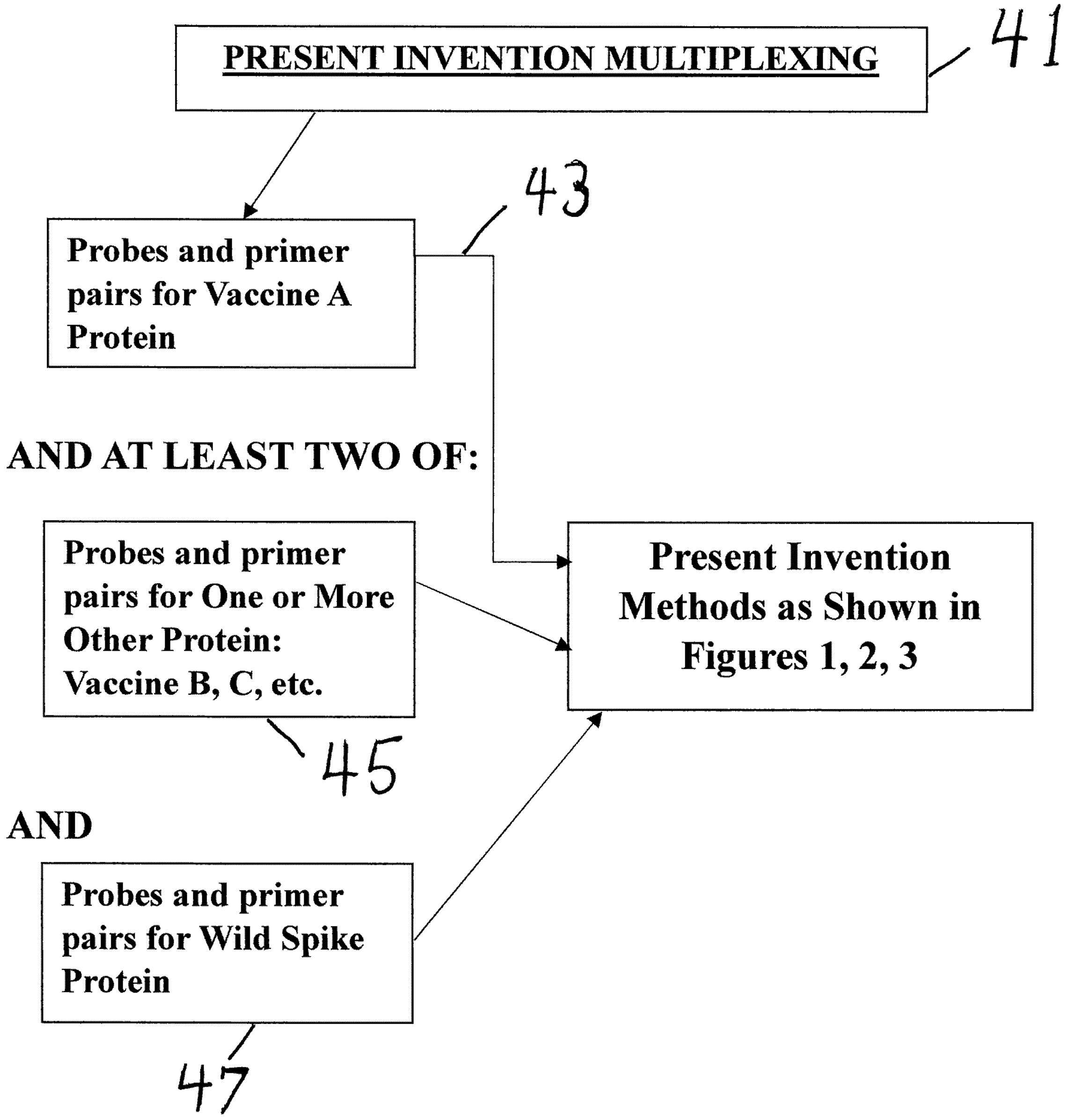
FIG. 4 shows a block diagram showing some of the features of another Present Invention Method, namely, multiplexing.

By "patient test samples" is meant one or more biological samples taken from a mammal, and most likely a human, that is testable for viruses. These would include blood, saliva, urine, tissues, bone, bone marrow, organ segments and any other testable biological samples.

By "negative effects" is meant adverse, unintended, or undesirable effects on a patient, such as infection, illness, disease or other adverse side effect, and including, but not limited to, chronic and fatal illnesses and diseases, and accelerated chronic and fatal illnesses and diseases.

By "virus vaccine spike protein" is meant a spike protein of a synthetic virus vaccine.

By "COVID vaccine spike protein" is meant a spike protein of a synthetic COVID virus vaccine, wherein the virus includes, but is not limited to COVID-19.

By "PCR" is meant polymerase chain reaction. By "RT-PCR" is meant reverse transcription polymerase chain reaction. (It does not mean real time polymerase chain reaction.) This is a laboratory and production technique combining reverse transcription of RNA into a complementary DNA referred to as cDNA, with amplification of the DNA targets. It is an iterative process of cycling temperatures sequentially in what is generally considered three steps: (a) melting, aka denaturation, of the RNA, that is thermally breaking the double strand molecule into two single strands; (b) annealing, aka hybridization of selected primers, that is, attaching selected identifiable primers to the RNA; and (c) extension, aka DNA synthesis. By repeating the cycle, the quantity of product increases geometrically with each cycle, providing two major benefits. First, it provides sufficient quantities of product to analyze what it is, that is, to confirm or deny presence of a particular molecule or portion thereof, and second, it provides sufficient quantities of product to determine how much is present.

By "qPCR" is meant quantitative PCR, also known as real time PCR. This involves measuring fluorescence signals during each PCR amplification cycle, enabling precise detection and quantification of target nucleic acids. Common implementations of the qPCR process utilize fluorescent probes that enable specific quantitation of target nucleic acids.

By "VAXX" is meant vaccine.

By "VAXX-specific primers" is meant primers that anneal to specific VAXX RNA.

By "wild spike protein-specific primers" is meant primers that anneal to wild spike protein.

VAXX-specific primers and wild spike protein-specific primers are preferentially and in many instances, necessarily, custom designed.

By "VAXX-specific probes" is meant probes that are probe-functional with specific VAXX RNA. These probes may be the same as those used in virus detection, as they act as catalysts to move primers to attach (anneal) to available VAXX RNA.

By "wild spike protein-specific probes" is meant the same or similar probes as VAXX-specific probes that will function as probes with wild spike protein.

The PCR process has historically been utilized to determine if a patient has a certain virus or other illness, as well as for diagnosis of genetic diseases, cancer detection and for laboratory development of antigens and for laboratory studies of various genomes of viruses.

The present invention, however, is not for detection of various illnesses and variants (mutations) or studies of various genome of viruses, but is directed to a new use, with refinements, of PCR, and preferably qPCR, to determine the presence or absence of specific synthetic vaccine molecules, aka VAXX, or wild spike molecules, in a patient. Because some practitioners have observed not only minor side effects, but very alarming side effects in vaccinated patients, which are believed to be attributed to the VAXX, and separately in patients who have not been vaccinated but have in some manner, managed to receive, capture and, to their detriment, maintain or grow VAXX, and further, to patients who have had severe negative effects who have wild spike protein molecule present. These negative effects range from minor, temporary aches and pain at the site of injection to chronic and life-threatening illnesses and diseases, various forms of cancer (collectively "negative effects"). Others have observed these negative effects with patients who have not been vaccinated, but who carry significantly sufficient wild spike protein, alone, or in combination with VAXX. Neither the VAXX manufacturers nor most of the medical profession acknowledge these problems and deny causal connections between the VAXX and/or wild spike protein, and these negative effects. Because it has been discovered that some patients who have not been (COVID) vaccinated, nonetheless, have COVID VAXX within their blood steam, and because some patients suffer from VAXX and/or wild spike protein negative effects, the present inventor has developed a method for detecting, identifying and quantifying the present of VAXX and/or wild spike protein in a patient. One of the issues is thus, denial of the relationship between the VAXX and/or wild spike protein and these negative effects, and another is proof of causation between them. Thus, the present invention is uniquely directed specifically to detecting, identifying and quantifying wild spike protein and vaccine spike protein in human test samples for either correlation of adverse side effects to the vaccine(s) and for subsequent, more effective treatment of patients who have vaccine or wild spike protein in their systems and who have suffered from serious or devastating illnesses and/or diseases.

In some embodiments, the present invention contemplates the use of RT-PCR and preferably qPCR to generate analyzable negative spike protein selected from the group consisting of VAXX spike protein, wild spike protein, and combinations thereof. Thus, the slow technique of end point PCR could be used, but in testing large populations of patients would be protracted and dangerously slow, and thus qPCR is preferred.

The process specifically involves the use of probes selected from VAXX-specific probes and wild spike protein specific probes, selected from those conventionally used in virus detection and are well known, or custom developed probes.

The process specifically involves the use of primers selected from VAXX-specific primers and wild spike protein specific primers that are custom-made. A sample of custom made VAXX-specific primers and wild spike protein specific primers, (custom made from programming such as are described below), are shown in Table 1, below:

TABLE 1

EXEMPLARY PRIMER PAIRS FOR WILD SPIKE PROTEIN, AND FOR MODERNA and PFIZER VACCINES

| Target | Forward_Primer | Reverse_Primer | Amplicon_Length | Forward_Start | Reverse_End |
|---|---|---|---|---|---|
| WTspike | CATGTCTCTGGGACCAATGG (SEQ ID NO: 1) | GGGACTGGGTCTTCGAATCT (SEQ ID NO: 2) | 145 | 204 | 348 |
| WTspike | CATGTCTCTGGGACCAATGG (SEQ ID NO: 1) | AGGGACTGGGTCTTCGAATC (SEQ ID NO: 3) | 146 | 204 | 349 |
| WTspike | CATGTCTCTGGGACCAATGG (SEQ ID NO: 1) | GTAGGGACTGGGTCTTCGAA (SEQ ID NO: 4 | 148 | 204 | 351 |

TABLE 1-continued

EXEMPLARY PRIMER PAIRS FOR WILD SPIKE PROTEIN, AND FOR MODERNA and PFIZER VACCINES

| Target | Forward_Primer | Reverse_Primer | Amplicon_Length | Forward_Start | Reverse_End |
|---|---|---|---|---|---|
| WTspike | CATGTCTCTGGGACCAATGG (SEQ ID NO: 1) | AGTAGGGACTGGGTCTTCGA (SEQ ID NO: 5) | 149 | 204 | 352 |
| WTspike | CATGTCTCTGGGACCAATGG (SEQ ID NO: 1) | AAGTAGGGACTGGGTCTTCG (SEQ ID NO: 6) | 150 | 204 | 353 |
| WTspike | CATGTCTCTGGGACCAATGG (SEQ ID NO: 1) | CTGAGGGAGATCACGCACTA (SEQ ID NO: 7) | 450 | 204 | 653 |
| WTspike | CATGTCTCTGGGACCAATGG (SEQ ID NO: 1) | CCTGAGGGAGATCACGCACT (SEQ ID NO: 8) | 451 | 204 | 654 |
| WTspike | CATGTCTCTGGGACCAATGG (SEQ ID NO: 1) | CCCTGAGGGAGATCACGCAC (SEQ ID NO: 9) | 452 | 204 | 655 |
| WTspike | CATGTCTCTGGGACCAATGG (SEQ ID NO: 1) | ACCCTGAGGGAGATCACGCA (SEQ ID NO: 10) | 453 | 204 | 656 |
| WTspike | CATGTCTCTGGGACCAATGG (SEQ ID NO: 1) | AACCCTGAGGGAGATCACGC (SEQ ID NO: 11) | 454 | 204 | 657 |
| Moderna | TGTTCCTGGTGCTGCTGCCC (SEQ ID NO: 12) | ACGCCCCGGGTGAAGCTGTT (SEQ ID NO: 13) | 100 | 8 | 107 |
| Moderna | TGTTCCTGGTGCTGCTGCCC (SEQ ID NO: 12) | TAGACGCCCCGGGTGAAGCT (SEQ ID NO: 14) | 103 | 8 | 110 |
| Moderna | TGTTCCTGGTGCTGCTGCCC (SEQ ID NO: 12) | AGTAGACGCCCCGGGTGAAG (SEQ ID NO: 15) | 105 | 8 | 112 |
| Moderna | TGTTCCTGGTGCTGCTGCCC (SEQ ID NO: 12) | TAGTAGACGCCCCGGGTGAA (SEQ ID NO: 16) | 106 | 8 | 113 |
| Moderna | TGTTCCTGGTGCTGCTGCCC (SEQ ID NO: 12) | GTAGTAGACGCCCCGGGTGA (SEQ ID NO: 17) | 107 | 8 | 114 |
| Moderna | TGTTCCTGGTGCTGCTGCCC (SEQ ID NO: 12) | TGTCGGGGTAGTAGACGCCC (SEQ ID NO: 18) | 114 | 8 | 121 |
| Moderna | TGTTCCTGGTGCTGCTGCCC (SEQ ID NO: 12) | TTGTCGGGGTAGTAGACGCC (SEQ ID NO: 19) | 115 | 8 | 122 |
| Moderna | TGTTCCTGGTGCTGCTGCCC (SEQ ID NO: 12) | CTTGTCGGGGTAGTAGACGC (SEQ ID NO: 20) | 116 | 8 | 123 |
| Moderna | TGTTCCTGGTGCTGCTGCCC (SEQ ID NO: 12) | CCTTGTCGGGGTAGTAGACG (SEQ ID NO: 21) | 117 | 8 | 124 |
| Moderna | TGTTCCTGGTGCTGCTGCCC (SEQ ID NO: 12) | ACCTTGTCGGGGTAGTAGAC (SEQ ID NO: 22) | 118 | 8 | 125 |
| Pfizer | TTCTTCTGGTCCCCACAGAC (SEQ ID NO: 23) | TGGTGGTCAGGTTCACACAC (SEQ ID NO: 24) | 100 | 15 | 114 |
| Pfizer | TTCTTCTGGTCCCCACAGAC (SEQ ID NO: 23) | CTGGTGGTCAGGTTCACACA (SEQ ID NO: 25) | 101 | 15 | 115 |
| Pfizer | TTCTTCTGGTCCCCACAGAC (SEQ ID NO: 23) | TCTGGTGGTCAGGTTCACAC (SEQ ID NO: 26) | 102 | 15 | 116 |
| Pfizer | TTCTTCTGGTCCCCACAGAC (SEQ ID NO: 23) | GTTCTGGTGGTCAGGTTCAC (SEQ ID NO: 27 | 104 | 15 | 118 |
| Pfizer | TTCTTCTGGTCCCCACAGAC (SEQ ID NO: 23) | GTGTTCTGGTGGTCAGGTTC (SEQ ID NO: 28) | 106 | 15 | 120 |
| Pfizer | TTCTTCTGGTCCCCACAGAC (SEQ ID NO: 23) | CTGTGTTCTGGTGGTCAGGT (SEQ ID NO: 29) | 108 | 15 | 122 |
| Pfizer | TTCTTCTGGTCCCCACAGAC (SEQ ID NO: 23) | GCTGTGTTCTGGTGGTCAGG (SEQ ID NO: 30) | 109 | 15 | 123 |
| Pfizer | TTCTTCTGGTCCCCACAGAC (SEQ ID NO: 23) | AGCTGTGTTCTGGTGGTCAG (SEQ ID NO: 31 | 110 | 15 | 124 |

TABLE 1-continued

EXEMPLARY PRIMER PAIRS FOR WILD SPIKE PROTEIN, AND FOR MODERNA and PFIZER VACCINES

| Target | Forward_Primer | Reverse_Primer | Amplicon_Length | Forward_Start | Reverse_End |
|---|---|---|---|---|---|
| Pfizer | TTCTTCTGGTCCCCACAGAC (SEQ ID NO: 23) | CAGCTGTGTTCTGGTGGTCA (SEQ ID NO: 32) | 111 | 15 | 125 |
| Pfizer | TTCTTCTGGTCCCCACAGAC (SEQ ID NO: 23) | GCAGCTGTGTTCTGGTGGTC (SEQ ID NO: 33) | 112 | 15 | 126 |

The above primers specific to the target vaccines and spike protein are exemplary, and those in Table 1 above, as well as functionally equivalent probes and primers may be structurally generated by inserting the particular non-virus target into an appropriate software program, such as the following architecture of a preferred software program:

A preferred architecture for a program of a present invention method for selecting unique VAXX-specific primers and wild spike protein specific primers, would be, in conjunction with a computer having a central processing unit, a program having the following computing capabilities:

a) Receiving and storing sequences of one or more vaccines having spike proteins, and/or wild spike protein sequences via sequence package input(s):
b) Setting primer generation parameters relating to step a) sequence(s);
c) Setting primer filtering parameters relating to step a) sequence(s);
d) Defining Amplicon Filtering criteria relating to step a) sequence(s);
e) Matching parameters of step a) sequence(s) to possible prime matching;
f) Applying primer subset parameters to accelerate processing;
g) Generating a candidate list of forward primers;
h) Generating candidate list of reverse primers;
i) Pairing selected forward and reverse primers;
j) Applying parallel processing parameters to present available cores;
k) Generating an output list of unique primer pairs.

In some preferred embodiments, vectorized filtering is included in the program using, for example, DNAStringSet and letterFrequency.

The generated unique primer pairs output list is then used to create the primers in a lab using standard primer design/construction methodology. The same architecture may be used to create probe lists as well.

Following the above architecture, a Windows laptop is used to produce unique VAXX-specific primers and wild spike protein specific primers, with the following specifications: The code requires a CPU with at least 8 cores, such as the Intel i7, 9th generation. The code does not require a minimum amount of memory although RStudio (below) requires at least 256 MB of RAM to run. While the minimum is possible, 16 GB of RAM or higher is recommended for significant improvements in total time to produce the results. RStudio is an integrated development environment for R, a programming language for statistical computing. RStudio downloaded onto the Windows Laptop. It is available for free download (link to RStudio) for Windows.

FASTA is a specific file type with a file extension of ".fasta". The file extension refers to a FASTA format file, which is commonly used in bioinformatics to represent nucleotide (DNA or RNA) or protein sequences. The respective Pfizer-BioNTech and Moderna and other virus vaccines, and/or wild spike FASTA files are read into the program. (The FASTA files contain the sequences, e.g., for the Pfizer-BioNTech & Moderna vaccines. The code is saved as file extension ".R" (i.e. multiplex_primer_design_code.R)

Code Overview

The following code provided is an example of code that was used for generating a list of primer pairs based on the respective vaccine and/or wild spike sequences supplied, e.g., Pfizer-BioNTech & Moderna sequences. To note, in this example code, thresholds are placed so that results could be reproduced on a typical personal computer with reasonable specifications. To generate a complete list of primers, significant cloud computing resources would be required to supply the computing power needed to accomplish the task within even a 24-hour period. Additionally, the thresholds are used due to the resultant dataset being so large, no human could reasonably assess it within a 24-hour period.

The steps of this exemplary code are, in plain language:

Read the FASTA file;
Create a list of the sequences for comparison later in the code;
Loop through the list of sequences;
While looping through the list of sequences;
Generate forward primers;
Filter down those forward primers to candidate primers;
Generate reverse primers;
Filter down those reverse primers to candidate primers;
Filter down the forward candidate primers to only unique primers;
Filter down the reverse candidate primers to only unique primers;
Pair the unique primers;
Add the paired unique primers to a viable primer candidate list;
Use the resultant paired unique primers list to create a Comma Separated Values (CSV) file. In the example code the resultant file is named "unique_primer_pairs.csv".

The following is a specific code, with explanations shown as #statements. In other words, the actual code is as follows, if the #comments are excluded.

```
##############################
# User-Selected Parameters
##############################
# Working Directory and Timing
script_start_time <- Sys.time ( )
```

-continued

```
# Input and Sequence Subsetting Parameters
fasta_file <- "output.fasta" # Input FASTA file
# To run on full sequences, comment out or remove any subsetting
# subset_start <- 1
# subset_end <- 800
# Primer Generation Parameters
min_len <- 20 # Minimum primer length
max_len <- 20 # Maximum primer length
# Primer Filtering Parameters
min_gc <- 0.55 # Minimum GC content
max_gc <- 0.65 # Maximum GC content
min_tm <- 50 # Minimum melting temperature
max_tm <- 70 # Maximum melting temperature
# Amplicon Filtering Criteria
min_amplicon <- 100 # Minimum acceptable amplicon length
max_amplicon <- 500 # Maximum acceptable amplicon length
# Matching Parameters
allowed mismatches <- 2 # Allowed mismatches in primer matching
# Primer Subsetting Parameter: use only the first xx unique
primers to speed up computation
subset_number <- 100
# Parallel Processing Parameter: fraction of available cores to
use
cores_ratio <- (7/8) # Use 7/8 of available cores
########################################################################
# 1) Setup: Read sequences from the FASTA file
########################################################################
library(Biostrings)
cat("Reading FASTA file...\n")
seqs <- readDNAStringSet(filepath = fasta_file, format = "fasta")
closeAllConnections( )
# (Optional) Subset sequences if desired.
# seqs <- subseq (seqs, start = subset_start, end = subset_end)
seq_list <- as.list(seqs)
target_names <- names(seq_list)
cat("Targets found:", paste(target_names, collapse = ", "), "\n")
########################################################################
# 2) Primer Generation and Filtering Functions
########################################################################
# Generate candidate forward primers using Views (vectorized
extraction).
generateForwardPrimers <- function(dna, min_len, max_len) {
    n <- as.integer(nchar(dna))
    if(n == 0) return(character(0))
    all_primers <- character(0)
    for (L in min_len:max_len) {
        if(n < L) next
        num_positions <- n - L + 1
        cat(" Forward: L =", L, ": using", num_positions, "start
positions\n")
        primers_this_length <- as.character(Views (dna, start =
seq_len(num_positions), width = L))
        all_primers <- c(all_primers, primers_this_length)
    }
    unique(all_primers)
}
# Generate candidate reverse primers using Views.
generateReversePrimers <- function(dna, min_len, max_len) {
    n <- as.integer(nchar(dna))
    if(n == 0) return (character (0))
    all_primers <- character (0)
    for (L in min_len:max_len) {
        if(n < L) next
        num positions <- n - L + 1
        cat(" Reverse: L =", L, ": using", num_positions, "start
positions\n")
        candidates <- Views(dna, start = seq_len(num_positions), width
= L)
        primers_this_length <-
as.character(reverseComplement(candidates))
        all_primers <- c(all_primers, primers_this_length)
    }
    unique(all_primers)
}
# Vectorized filtering of candidate primers using DNAStringSet and
letterFrequency.
filterCandidatePrimers <- function(primers, min_gc_val,
max_gc_val, min_tm_val, max_tm_val) {
    if (length(primers) == 0) return(character (0))
```

-continued

```
    ds <- DNAStringSet(primers)
    counts <- letterFrequency(ds, letters = c("G", "C"))
    gc_counts <- rowSums(counts)
    primer_lengths <- width(ds)
    gc_content <- gc_counts / primer_lengths
    tm <- 2 * (primer_lengths - gc_counts) + 4 * gc_counts
    keep <- which(gc_content >= min_gc_val & gc_content <=
max_gc_val &
                    tm >= min_tm_val & tm <= max_tm_val)
    as.character(ds[keep])
  }
  # Uniqueness check: uses countPattern( ) because our subject is a
single XString.
  bulkUniquePrimersMultiLength <- function(primers, target_seq,
other_seqs) {
    if(length(primers) == 0) return(character (0))
    if(length(other_seqs) == 0) return (primers)
    unique(primers[!vapply(primers, function(p) {
      any(sapply(other_seqs, function(seq) countPattern(p, seq) >
0))
    }, logical(1))])
  }
  ######################################################################
  # 3) Amplicon Matching Function
  ######################################################################
  findAmpliconPositions <- function(target_seq, target_rc,
fwd_primer, rev_primer) {
    fwd match <- matchPattern(fwd_primer, target_seq, max.mismatch =
allowed_mismatches)
    rev_match <- matchPattern(rev_primer, target_rc, max.mismatch =
allowed_mismatches)
    if(length(fwd_match) == 0 | | length(rev_match) == 0)
return(NULL)
    fwd_start <- start(fwd_match)[1]
    rev_start_fwd <- nchar(target_seq) - start(rev_match)[1] -
nchar(rev_primer) + 2
    rev_end_fwd <- rev_start_fwd + nchar(rev_primer) - 1
    if(rev_start_fwd <= fwd_start) return(NULL)
    list(fwd_start = fwd_start, rev_end = rev_end_fwd,
         length = rev_end_fwd - fwd_start + 1)
  }
  ######################################################################
  # 4) Process Each Target: Generate, Subset, and Then Pair Primers
  ######################################################################
  library(parallel)
  all_valid_pairs <- list( )
  for(tid in target_names) {
    cat("\n====================================\n")
    cat("Processing target:", tid, "\n")
    tseq <- seq_list[[tid]]
    cat("Target", tid, "has sequence length: ", nchar(tseq), "\n")
    # Generate forward candidates.
    cat("Generating forward primers...\n")
    fwd_candidates <- generateForwardPrimers(tseq, min_len, max_len)
    cat(" Initial forward candidates count:",
length(fwd_candidates), "\n")
    fwd_candidates <- filterCandidatePrimers(fwd_candidates, min_gc,
max_gc, min_tm, max_tm)
    cat(" Filtered forward candidates count:",
length(fwd_candidates), "\n")
    # Generate reverse candidates.
    cat("Generating reverse primers...\n")
    rev_candidates <- generateReversePrimers(tseq, min_len, max_len)
    cat(" Initial reverse candidates count:",
length(rev_candidates), "\n")
    rev_candidates <- filterCandidatePrimers(rev_candidates, min_gc,
max_gc, min_tm, max_tm)
    cat(" Filtered reverse candidates count:",
length(rev_candidates), "\n")
    # Check uniqueness against other targets.
    other_ids <- setdiff(target_names, tid)
    other_seqs <- lapply(other_ids, function (x) seqs[[x]])
    fwd_unique <- bulkUniquePrimersMultiLength(fwd_candidates, tseq,
other_seqs)
    rev_unique <- bulkUniquePrimersMultiLength(rev_candidates, tseq,
other_seqs)
    cat("Unique forward primers count:", length(fwd_unique), "\n")
    cat("Unique reverse primers count:", length(rev_unique), "\n")
    # Subset the unique primers to use only the first 150 (if
```

-continued

```
available)
        fwd_list <- if(length(fwd_unique) >= subset_number)
fwd_unique[1:subset_number] else fwd_unique
        rev_list <- if(length(rev_unique) >= subset_number)
rev_unique[1:subset_number] else rev_unique
        cat("Using", length(fwd_list), "forward and", length(rev_list),
"reverse unique candidates for pairing.\n")
        # Precompute the reverse complement of the target.
        target_rc <- reverseComplement(tseq)
        # Set up parallel processing.
        total_cores <- detect Cores( )
        num_cores <- max(1, round(total_cores * cores_ratio))
        cat("Setting up parallel processing using", num_cores,
"cores...\n")
        cl <- makeCluster(num_cores)
        clusterEvalQ(cl, library(Biostrings))
        clusterExport(cl, varlist = c("findAmpliconPositions", "tseq",
"target_rc", "rev_list"
                                        "min_amplicon", "max_amplicon",
"allowed_mismatches") ,
                            envir = environment( ))
        candidate_start_time <- Sys.time( )
        # Pair the unique (and subsetted) primers in parallel.
        pairs_list <- parLapply(cl, fwd_list, function(fwd_p) {
            local_valid <- list( )
            for (rev_p in rev_list) {
                pos_info <- findAmpliconPositions(tseq, target_rc, fwd_p,
rev_p)
                if(!is.null(pos_info) && pos_info$length >= min_amplicon &&
pos_info$length <= max_amplicon)
                local_valid <- c(local_valid, list(list(forward_seq = fwd_p,
                                                reverse_seq = rev_p,
                                        amplicon_length = pos_info$length,
                                            fwd_start = pos_info$fwd_start,
                                                rev_end = pos_info$rev_end)))
            }
            local_valid
        })
        valid pairs <- do.call(c, pairs_list)
        stopCluster(cl)
        candidate_end_time <- Sys.time( )
        candidate_time <- difftime(candidate_end_time,
candidate_start_time, units = "secs")
        cat("Unique primer pair identification for target", tid, "took",
round(as.numeric(candidate_time), 2), "seconds.\n")
        cat("Target", tid, "valid (unique) pairs found:",
length(valid_pairs), "\n")
        all_valid pairs[[tid]] <- valid pairs
    }
    ####################################################################
    # 5) Final Report and Output of Unique Primer Pairs
    ####################################################################
    cat("\n===================================\n")
    cat("=== Final Primer Report ===\n")
    for(tid in names(all_valid pairs)) {
        cat("Target:", tid, "\n")
        cat(" Unique Pairs Found:", length(all_valid pairs[[tid]]),
"\n")
    }
    cat("\nWriting unique primer pairs to CSV...\n")
    output_rows_list <- list( )
    row_counter <- 1
    for(tid in names(all_valid pairs)) {
        pairs <- all_valid pairs[[tid]]
        if(length(pairs) > 0) {
            for(pair in pairs) {
                output_rows_list[[row_counter]] <- data.frame(
                        Target = tid,
                        Forward_Primer = pair$forward_seq,
                        Reverse_Primer = pair$reverse_seq,
                        Amplicon_Length = pair$amplicon_length,
                        Forward_Start = pair$fwd_start,
                        Reverse_End = pair$rev_end,
                        stringsAsFactors = FALSE
                )
                row_counter <- row_counter + 1
            }
        }
    }
```

-continued

```
    if (length(output_rows_list) > 0) {
       output_rows <- do.call(rbind, output_rows_list)
    } else {
       output_rows <- data.frame(Target=character(0),
Forward_Primer=character(0),
                         Reverse_Primer=character(0),
Amplicon_Length=integer(0),
                         Forward_Start=integer (0) ,
Reverse_End=integer(0), stringsAsFactors = FALSE)
    }
    output_filename <- "unique_primer_pairs.csv"
    write.csv(output_rows, file = output_filename, row.names = FALSE)
    cat("Unique primer pairs written to", output_filename, "\n")
    ######################################################################
    # Final Runtime (in minutes)
    ######################################################################
    script_end_time <- Sys.time( )
    runtime_minutes <- as.numeric(difftime(script_end_time,
script_start_time, units = "mins"))
    cat("\nTotal Runtime:", round(runtime_minutes, 2), "minutes\n")
```

The resulting lists of primers are used to create/select appropriate pairs for the present invention indirect detection methods of testing. The following set forth the actual target sequences that may be used in the present invention methods.

Although the present invention is not specifically limited to the following examples, wild spike protein, Moderna COVID-19 VAXX and Pfizer COVID-19 VAXX are examined.

Sample Vaccine/Wild Spike Sequences

Table 2, below, shows the Synthetic construct Wild Spike Protein Sequence.

TABLE 2

| WILD SPIKE PROTEIN SEQUENCE (SEQ ID NO: 34). |
|---|
| tgtttgtttttcttgttttattgccactagtctctagtcagtgtgttaa |
| tcttacaaccagaactaattaccccctgcatacactaattctttcacac |
| gtggtgtttattaccctgacaaagttttcagatcctcagttttacattc |
| aactcaggacttgttcttacctttcttttccaatgttacttggttccat |
| gctatacatgtctctgggaccaatggtactaagaggtttgataaccctg |
| tcctaccatttaatgatggtgtttattttgcttccactgagaagtctaa |
| cataataagaggctggatttttggtactactttagattcgaagacccag |
| tccctacttattgttaataacgctactaatgttgttattaaagtctgtg |
| aatttcaattttgtaatgatccatttttgggtgtttattaccacaaaaa |
| caacaaaagttggatggaaagtgagttcagagtttattctagtgcgaat |
| aattgcacttttgaatatgtctctcagccttttcttatggaccttgaag |
| gaaaacagggtaatttcaaaaatcttagggaatttgtgtttaagaatat |
| tgatggttattttaaaatatattctaagcacacgcctattaatttagtg |
| cgtgatctccctcagggtttttcggctttagaaccattggtagatttgc |
| caataggtattaacatcactaggtttcaaactttacttgctttacatag |
| aagttatttgactcctggtgattcttcttcaggttggacagctggtgct |
| gcagcttattatgtgggttatcttcaacctaggacttttctattaaaat |
| ataatgaaaatggaaccattacagatgctgtagactgtgcacttgaccc |

TABLE 2-continued

| WILD SPIKE PROTEIN SEQUENCE (SEQ ID NO: 34). |
|---|
| tctctcagaaacaaagtgtacgttgaaatccttcactgtagaaaaagga |
| atctatcaaacttctaactttagagtccaaccaacagaatctattgtta |
| gatttcctaatattacaaacttgtgcccttttggtgaagtttttaacgc |
| caccagatttgcatctgtttatgcttggaacaggaagagaatcagcaac |
| tgtgttgctgattattctgtcctatataattccgcatcattttccactt |
| ttaagtgttatggagtgtctcctactaaattaaatgatctctgctttac |
| taatgtctatgcagattcatttgtaattagaggtgatgaagtcagacaa |
| atcgctccagggcaaactggaaagattgctgattataattataaattac |
| cagatgattttacaggctgcgttatagcttggaattctaacaatcttga |
| ttctaaggttggtggtaattataattacctgtatagattgtttaggaag |
| tctaatctcaaaccttttgagagagatatttcaactgaaatctatcagg |
| ccggtagcacaccttgtaatggtgttgaaggttttaattgttactttcc |
| tttacaatcatatggtttccaacccactaatggtgttggttaccaacca |
| tacagagtagtagtactttcttttgaacttctacatgcaccagcaactg |
| tttgtggacctaaaaagtctactaatttggttaaaaacaaatgtgtcaa |
| tttcaacttcaatggtttaacaggcacaggtgttcttactgagtctaac |
| aaaaagtttctgcctttccaacaatttggcagagacattgctgacacta |
| ctgatgctgtccgtgatccacagacacttgagattcttgacattacacc |
| atgttcttttggtggtgtcagtgttataacaccaggaacaaatacttct |
| aaccaggttgctgttctttatcaggatgttaactgcacagaagtccctg |
| ttgctattcatgcagatcaacttactcctacttggcgtgtttattctac |
| aggttctaatgtttttcaaacacgtgcaggctgtttaataggggctgaa |
| catgtcaacaactcatatgagtgtgacatacccattggtgcaggtatat |
| gcgctagttatcagactcagactaattctcctcggcgggcacgtagtgt |
| agctagtcaatccatcattgcctacactatgtcacttggtgcagaaaat |
| tcagttgcttactctaataactctattgccatacccacaaattttacta |

TABLE 2-continued

| WILD SPIKE PROTEIN SEQUENCE (SEQ ID NO: 34). |
|---|
| ttagtgttaccacagaaattctaccagtgtctatgaccaagacatcagt |
| agattgtacaatgtacatttgtggtgattcaactgaatgcagcaatctt |
| ttgttgcaatatggcagtttttgtacacaattaaaccgtgctttaactg |
| gaatagctgttgaacaagacaaaaacacccaagaagtttttgcacaagt |
| caaacaaatttacaaaacaccaccaattaaagattttggtggttttaat |
| ttttcacaaatattaccagatccatcaaaaccaagcaagaggtcattta |
| ttgaagatctacttttcaacaaagtgacacttgcagatgctggcttcat |
| caaacaatatggtgattgccttggtgatattgctgctagagacctcatt |
| tgtgcacaaaagtttaacggccttactgttttgccacctttgctcacag |
| atgaaatgattgctcaatacacttctgcactgttagcgggtacaatcac |
| ttctggttggacctttggtgcaggtgctgcattacaaataccatttgct |
| atgcaaatggcttataggtttaatggtattggagttacacagaatgttc |
| tctatgagaaccaaaaattgattgccaaccaatttaatagtgctattgg |
| caaaattcaagactcactttcttccacagcaagtgcacttggaaaactt |
| caagatgtggtcaaccaaaatgcacaagctttaaacacgcttgttaaac |
| aacttagctccaattttggtgcaatttcaagtgttttaaatgatatcct |
| ttcacgtcttgacaaagttgaggctgaagtgcaaattgataggttgatc |
| acaggcagacttcaaagtttgcagacatatgtgactcaacaattaatta |
| gagctgcagaaatcagagcttctgctaatcttgctgctactaaaatgtc |

TABLE 2-continued

| WILD SPIKE PROTEIN SEQUENCE (SEQ ID NO: 34). |
|---|
| agagtgtgtacttggacaatcaaaaagagttgatttttgtggaaagggc |
| tatcatcttatgtccttccctcagtcagcacctcatggtgtagtcttct |
| tgcatgtgacttatgtccctgcacaagaaaagaacttcacaactgctcc |
| tgccatttgtcatgatggaaaagcacactttcctcgtgaaggtgtcttt |
| gtttcaaatggcacacactggtttgtaacacaaaggaatttttatgaac |
| cacaaatcattactacagacaacacatttgtgtctggtaactgtgatgt |
| tgtaataggaattgtcaacaacacagtttatgatcctttgcaacctgaa |
| ttagactcattcaaggaggagttagataaatattttaagaatcatacat |
| caccagatgttgatttaggtgacatctctggcattaatgcttcagttgt |
| aaacattcaaaaagaaattgaccgcctcaatgaggttgccaagaattta |
| aatgaatctctcatcgatctccaagaacttggaaagtatgagcagtata |
| taaaatggccatggtacatttggctaggttttatagctggcttgattgc |
| catagtaatggtgacaattatgctttgctgtatgaccagttgctgtagt |
| tgtctcaagggctgttgttcttgtggatcctgctgcaaatttgatgaag |
| acgactctgagccagtgctcaaaggagtcaaattacattacacataa |

Table 3, below, shows the Synthetic construct HCV1146 Moderna (mRNA-1273) SARS-CoV-2 vaccine sequence. (Source: AUTHORS Castruita, J. A. S., Schneider, U. V., Mollerup, S. Submitted (10 Sep. 2021) Department of Clinical Microbiology, Copenhagen University Hospital Amager-Hvidovre, University of Copenhagen, Kettegaard Alle 30, Hvidovre 2650, Denmark.)

TABLE 3

| MODERNA (mRNA-1273) SARS-COV-2 VACCINE SEQUENCE (SEQ ID NO: 35). |
|---|
| Origin |
| (SEQ ID NO: 35) |
| 1 atgttcgtgt tcctggtgct gctgcccctg gtgagcagcc agtgcgtgaa cctgaccacc |
| 61 cggacccagc tgccaccagc ctacaccaac agcttcaccc ggggcgtcta ctaccccgac |
| 121 aaggtgttcc ggagcagcgt cctgcacagc acccaggacc tgttcctgcc cttcttcagc |
| 181 aacgtgacct ggttccacgc catccacgtg agcggcacca acggcaccaa gcggttcgac |
| 241 aaccccgtgc tgcccttcaa cgacggcgtg tacttcgcca gcaccgagaa gagcaacatc |
| 301 atccggggct ggatcttcgg caccaccctg gacagcaaga cccagagcct gctgatcgtg |
| 361 aataacgcca ccaacgtggt gatcaaggtg tgcgagttcc agttctgcaa cgaccccttc |
| 421 ctgggcgtgt actaccacaa gaacaacaag agctggatgg agagcgagtt ccgggtgtac |
| 481 agcagcgcca acaactgcac cttcgagtac gtgagccagc ccttcctgat ggacctggag |
| 541 ggcaagcagg gcaacttcaa gaacctgcgg gagttcgtgt tcaagaacat cgacggctac |
| 601 ttcaagatct acagcaagca caccccaatc aacctggtgc gggatctgcc ccagggcttc |
| 661 tcagccctgg agcccctggt ggacctgccc atcggcatca acatcacccg gttccagacc |
| 721 ctgctggccc tgcaccggag ctacctgacc ccaggcgaca gcagcagcgg gtggacagca |
| 781 ggcgcggctg cttactacgt gggctacctg cagccccgga ccttcctgct gaagtacaac |
| 841 gagaacggca ccatcaccga cgccgtggac tgcgccctgg accctctgag cgagaccaag |
| 901 tgcaccctga agagcttcac cgtggagaag ggcatctacc agaccagcaa cttccgggtg |

TABLE 3-continued

MODERNA (mRNA-1273) SARS-COV-2 VACCINE SEQUENCE (SEQ ID NO: 35).

```
 961 cagcccaccg agagcatcgt gcggttcccc aacatcacca acctgtgccc cttcggcgag
1021 gtgttcaacg ccacccggtt cgccagcgtg tacgcctgga accggaagcg gatcagcaac
1081 tgcgtggccg actacagcgt gctgtacaac agcgccagct tcagcacctt caagtgctac
1141 ggcgtgagcc ccaccaagct gaacgacctg tgcttcacca acgtgtacgc cgacagcttc
1201 gtgatccgtg gcgacgaggt gcggcagatc gcacccggcc agacaggcaa gatcgccgac
1261 tacaactaca agctgcccga cgacttcacc ggctgcgtga tcgcctggaa cagcaacaac
1321 ctcgacagca aggtgggcgg caactacaac tacctgtacc ggctgttccg gaagagcaac
1381 ctgaagccct tcgagcggga catcagcacc gagatctacc aagccggctc caccccttgc
1441 aacggcgtgg agggcttcaa ctgctacttc cctctgcaga gctacggctt ccagcccacc
1501 aacggcgtgg gctaccagcc ctaccgggtg gtggtgctga gcttcgagct gctgcacgcc
1561 ccagccaccg tgtgtggccc caagaagagc accaacctgg tgaagaacaa gtgcgtgaac
1621 ttcaacttca acggccttac cggcaccggc gtgctgaccg agagcaacaa gaaattcctg
1681 ccctttcagc agttcggccg ggacatcgcc gacaccaccg acgctgtgcg ggatccccag
1741 accctggaga tcctggacat caccccttgc agcttcggcg gcgtgagcgt gatcacccca
1801 ggcaccaaca ccagcaacca ggtggccgtg ctgtaccagg acgtgaactg caccgaggtg
1861 cccgtggcca tccacgccga ccagctgaca cccacctggc gggtctacag caccggcagc
1921 aacgtgttcc agacccgggc cggttgcctg atcggcgccg agcacgtgaa caacagctac
1981 gagtgcgaca tccccatcgg cgccggcatc tgtgccagct accagaccca gaccaattca
2041 ccccggaggg caaggagcgt ggccagccag agcatcatcg cctacaccat gagcctgggc
2101 gccgagaaca gcgtggccta cagcaacaac agcatcgcca tccccaccaa cttcaccatc
2161 agcgtgacca ccgagattct gcccgtgagc atgaccaaga ccagcgtgga ctgcaccatg
2221 tacatctgcg gcgacagcac cgagtgcagc aacctgctgc tgcagtacgg cagcttctgc
2281 acccagctga accgggccct gaccggcatc gccgtggagc aggacaagaa cacccaggag
2341 gtgttcgccc aggtgaagca gatctacaag acccctccca tcaaggactt cggcggcttc
2401 aacttcagcc agatcctgcc cgaccccagc aagcccagca agcggagctt catcgaggac
2461 ctgctgttca acaaggtgac cctagccgac gccggcttca tcaagcagta cggcgactgc
2521 ctcggcgaca tagccgcccg ggacctgatc tgcgcccaga agttcaacgg cctgaccgtg
2581 ctgcctcccc tgctgaccga cgagatgatc gcccagtaca ccagcgccct gttagccgga
2641 accatcacca gcggctggac tttcggcgct ggagccgctc tgcagatccc cttcgccatg
2701 cagatggcct accggttcaa cggcatcggc gtgacccaga acgtgctgta cgagaaccag
2761 aagctgatcg ccaaccagtt caacagcgcc atcggcaaga tccaggacag cctgagcagc
2821 accgctagcg ccctgggcaa gctgcaggac gtggtgaacc agaacgccca ggccctgaac
2881 accctggtga agcagctgag cagcaacttc ggcgccatca gcagcgtgct gaacgacatc
2941 ctgagccggc tggaccctcc cgaggccgag gtgcagatcg accggctgat cactggccgg
3001 ctgcagagcc tgcagaccta cgtgacccag cagctgatcc gggccgccga gattcgggcc
3061 agcgccaacc tggccgccac caagatgagc gagtgcgtgc tgggccagag caagcgggtg
3121 gacttctgcg gcaagggcta ccacctgatg agctttcccc agagcgcacc ccacggagtg
3181 gtgttcctgc acgtgaccta cgtgcccgcc caggagaaga acttcaccac cgccccagcc
3241 atctgccacg acggcaaggc ccactttccc cgggagggcg tgttcgtgag caacggcacc
```

TABLE 3-continued

| MODERNA (mRNA-1273) SARS-COV-2 VACCINE SEQUENCE (SEQ ID NO: 35). |
|---|
| 3301 cactggttcg tgacccagcg gaacttctac gagccccaga tcatcaccac cgacaacacc |
| 3361 ttcgtgagcg gcaactgcga cgtggtgatc ggcatcgtga acaacaccgt gtacgatccc |
| 3421 ctgcagcccg agctggacag cttcaaggag gagctggaca agtacttcaa gaatcacacc |
| 3481 agccccgacg tggacctggg cgacatcagc ggcatcaacg ccagcgtggt gaacatccag |
| 3541 aaggagatcg atcggctgaa cgaggtggcc aagaacctga acgagagcct gatcgacctg |
| 3601 caggagctgg gcaagtacga gcagtacatc aagtggccct ggtacatctg gctgggcttc |
| 3661 atcgccggcc tgatcgccat cgtgatggtg accatcatgc tgtgctgcat gaccagctgc |
| 3721 tgcagctgcc tgaagggctg ttgcagctgc ggcagctgct gcaagttcga cgaggacgac |
| 3781 agcgagcccg tgctgaaggg cgtgaagctg cactacacct gataatag |

Table 4, below, shows the Synthetic construct Pfizer-BioNTech (BTN162b2) SARS-CoV-2 vaccine sequence. (Source: AUTHORS Castruita, J. A. S., Schneider, U. V., Mollerup, S., Leineweber, T. D., Weis, N., Bukh, J., Pedersen, M. S., and Westh, H. Submitted (10 Sep. 2021) Department of Clinical Microbiology, Copenhagen University Hospital Amager-Hvidovre, University of Copenhagen, Kettegaard Alle 30, Hvidovre 2650, Denmark.)

TABLE 4

| PFIZER-BIONTECH (BTN162b2) SARS-COV-2 VACCINE SEQUENCE (SEQ ID NO: 36). |
|---|
| Origin |
| (SEQ ID NO: 36) |
| 1 accagaacac agctgcctcc agcctacacc aacagcttta ccagaggcgt gtactacccc |
| 61 gacaaggtgt tcagatccag cgtgctgcac tctacccagg acctgttcct gcctttcttc |
| 121 agcaacgtga cctggttcca cgccatccac gtgtccggca ccaatggcac caagagattc |
| 181 gacaaccccg tgctgccctt caacgacggg gtgtactttg ccagcaccga gaagtccaac |
| 241 atcatcagag gctggatctt cggcaccaca ctggacagca agacccagag cctgctgatc |
| 301 gtgaacaacg ccaccaacgt ggtcatcaaa gtgtgcgagt tccagttctg caacgacccc |
| 361 ttcctgggcg tctactacca caagaacaac aagagctgga tggaaagcga gttccgggtg |
| 421 tacagcagcg ccaacaactg caccttcgag tacgtgtccc agcctttcct gatggacctg |
| 481 gaaggcaagc agggcaactt caagaacctg cgcgagttcg tgtttaagaa catcgacggc |
| 541 tacttcaaga tctacagcaa gcacacccct atcaacctcg tgcgggatct gcctcagggc |
| 601 ttctctgctc tggaacccct ggtggatctg cccatcggca tcaacatcac ccggtttcag |
| 661 acactgctgg ccctgcacag aagctacctg acacctggcg atagcagcag cggatggaca |
| 721 gctggtgccg ccgcttacta tgtgggctac ctgcagccta gaaccttcct gctgaagtac |
| 781 aacgagaacg gcaccatcac cgacgccgtg gattgtgctc tggatcctct gagcgagaca |
| 841 aagtgcaccc tgaagtcctt caccgtggaa aagggcatct accagaccag caacttccgg |
| 901 gtgcagccca ccgaatccat cgtgcggttc cccaatatca ccaatctgtg ccccttcggc |
| 961 gaggtgttca atgccaccag attcgcctct gtgtacgcct ggaaccggaa gcggatcagc |
| 1021 aattgcgtgg ccgactactc cgtgctgtac aactccgcca gcttcagcac cttcaagtgc |
| 1081 tacggcgtgt cccctaccaa gctgaacgac ctgtg |
| [gap 132 bp] Expand Ns |

TABLE 4-continued

| PFIZER-BIONTECH (BTN162b2) SARS-COV-2 VACCINE SEQUENCE (SEQ ID NO: 36). |
|---|
| 1248 ctg gaacagcaac |
| 1261 aacctggact ccaaagtcgg cggcaactac aattacctgt accggctgtt ccggaagtcc |
| 1321 aatctgaagc ccttcgagcg ggacatctcc accgagatct atcaggccgg cagcacccct |
| 1381 tgtaacggcg tggaaggctt caactgctac ttcccactgc agtcctacgg ctttcagccc |
| 1441 acaaatggcg tgggctatca gccctacaga gtggtggtgc tgagcttcga actgct |
| [gap 258 bp] Expand Ns |
| 1755 cagcaa tcaggtggca gtgctgtacc aggacgtgaa ctgtaccgaa |
| 1801 gtgcccgtgg ccattcacgc cgatcagctg acacctacat ggcgggtgta ctccaccggc |
| 1861 agcaatgtgt ttcagaccag agccggctgt ctgatcggag ccgagcacgt gaacaatagc |
| 1921 tacgagtgcg acatccccat cggcgctgga atctgcgcca gctaccagac acagacaaac |
| 1981 agccctcgga gagccagaag cgtggccagc cagagcatca ttgcctacac aatgtctctg |
| 2041 ggcgccgaga acagcgtggc ctactccaac aactctatcg ctatccccac caacttcacc |
| 2101 atcagcgtga ccacagagnn nnnnnnnnnn nnnnnnncca agaccagcgt ggactgcacc |
| 2161 atgtacatct gcggcgattc caccgagtgc tccaacctgc tgctgcagta cggcagcttc |
| 2221 tgcacccagc tgaatagagc cctgacaggg atcgccgtgg aacaggacaa gaacacccaa |
| 2281 gaggtgttcg cccaagtgaa gcagatctac aagacccctc ctatcaagga cttcggcggc |
| 2341 ttcaatttca gccagattct gcccgatcct agcaagccca gcaagcggag cttcatcgag |
| 2401 gacctgctgt tcaacaaagt gacactggcc gacgccggct tcatcaagca gtatggcgat |
| 2461 tgtctgggcg acattgccgc cagggatctg atttgcgccc agaagtttaa cggactgaca |
| 2521 gtgctgcctc ctctgctgac cgatgagatg atcgcccagt acacatctgc cctgctggcc |
| 2581 ggcacaatca caagcggctg gacatttgga gcaggcgccg ctctgcagat cccctttgct |
| 2641 atgcagatgg cctaccggtt caacggcatc ggagtgaccc agaatgtgct gtacgagaac |
| 2701 cagaagctga tcgccaacca gttcaacagc gccatcggca agatccagga cagcctgagc |
| 2761 agcacagcaa gcgccctggg aaagctgcag gacgtggtca accagaatgc ccaggcactg |
| 2821 aacaccctgg tcaagcagct gtcctccaac ttcggcgcca tcagctctgt gctgaacgat |
| 2881 atcctgagca gactggaccc tcctgaggcc gaggtgcaga tcgacagact gatcacaggc |
| 2941 agactgcaga gcctccagac atacgtgacc cagcagctga tcagagccgc cgagattaga |
| 3001 gcctctgcca atctggccgc caccaagatg tctgagtgtg tgctgggcca gagcaagaga |
| 3061 gtggactttt gcggcaaggg ctaccacctg atgagcttcc ctcagtctgc cnnnnacggc |
| 3121 gtggtgtttc tgcacgtgac atatgtgccc gctcaagaga agaatttcac caccgctcca |
| 3181 gccatctgcc acgacggcaa agcccacttt cctagagaag gcgtgttcgt gtccaacggc |
| 3241 acccattggt tcgtgacaca gcggaannnn nnnnnnnnnn nnnnnntcac caccgacaac |
| 3301 accttcgtgt ctggcaactg cgacgtcgtg atcggcattg tgaacaatac cgtgtacgac |
| 3361 cctctgcagc ccgagctgga cagcttcaaa gaggaactgg acaagtactt taagaaccac |
| 3421 acaagccccg acgtggacct gggcgatatc agcggaatca atgccagcgt cgtgaacatc |
| 3481 cagaaagaga tcgaccggct gaacgaggtg gccaagaatc tgaacgagag cctgatcgac |
| 3541 ctgcaagaac tggggaagta cgagcagtac atcaagtggc cctggtacat ctggctgggc |
| 3601 tttatcgccg gactgattgc catcgtgatg gtcacaatca tgctgtgttg catgaccagc |
| 3661 tgctgtagct gcctgaaggg ctgttgtagc tgtggcagct gctgcaagtt cgacgaggac |

Additional synthetic constructs of other manufactured vaccines, such as Astra Zeneca, Johnson & Johnson and other vaccines, may be determined by known laboratory techniques, such as used to obtain Moderna, and Pfizer vaccine sequences shown in Tables 3 and 4 above.

Procedures

In the methods of the present invention, samples taken from patients may be used for the present invention processing without RNA isolation. However, it is more preferred and more reliable to first isolate the RNA of the sample through known techniques. Patient samples of various types may require different isolation (extraction) procedure details, but isolation of RNA in any bodily fluid or other sample, is well known. For example, MagMAX™ Viral/Pathogen Nucleic Acid Isolation Kit or MagMAX™ Viral/Pathogen II Nucleic Acid Isolation Kit, obtained from Thermo-Fisher Scientific (supra), may be utilized. Guidelines for RNA extraction are provided with the kits. Extracted RNA can be prepared with any standard RNA extraction procedure or RNA extraction kit. The minimum recommended elution volume is 50 μL.

Sample input volumes are a function of the equipment and procedures used. To meet the need for a broad range of sample input volumes, two exemplary RT-PCR protocols are used, depending on the sample input volume. The following sample input volumes are tested: Low input: 200 μL; and, High input: 400 μL. These sample volumes are used with most RT-PCR procedures, such as with the TaqPath™ COVID-19 CE-IVD RT-PCR Kit available from Thermo-Fisher Scientific, Bridgewater, New Jersey USA/Life Technologies Corporation, Pleasanton, CA, USA.

The following guides are defined as optimal for the use of the TaqPath™ COVID-19 CE-IVD RT-PCR Kit. The MS2 Phage Control provided in the kit may be used to verify the efficacy of the sample preparation and the absence of inhibitors in the RT-PCR reaction. It is added to the sample before extraction. Nuclease-free Water (not DEPC-Treated) containing MS2 Phage Control is used as the Negative Control for RT-PCR. The recommended volume of MS2 Phage Control is 2.5% of the sample input volume. The below Examples are performed using the TaqPath™ COVID-19 CE-IVD RT-PCR Kit, including the precursor steps: Adding the appropriate volume of MS2 Phage Control to each sample well (Approx. 2.5% of the sample input volume) and to the Negative Control, well just before lysis during RNA extraction.

Instrumentation and related equipment for performing RT-PCR are commercially available and designed to operate with available PCR kits, such as the TaqPath™ COVID-19 CE-IVD RT-PCR Kit, which is used herein. Applied Biosystems/Thermo-Fisher Scientific has a family of instruments available for RT-PCR processing, including Applied Biosystems 7500 Fast Dx Real-Time PCR Instrument; Applied Biosystems 7500 Fast Real-Time PCR Instrument; Applied Biosystems 7500 Real-Time PCR Instrument; Applied Biosystems QuantStudio 5 Dx Real-Time PCR Instrument; Applied Biosystems QuantStudio 7 Flex Real-Time PCR Instrument; and others.

The difference between the existing technology and the present invention lies not in the instrumentation or general procedure of RT-PCR, but rather in the basic novel premise of testing human samples for the presence or absence of vaccines and wild spike protein, rather than for covid or other viruses or ailments; and, in the use of unique sets of primers/probes that are specific for spike protein nucleic acid from each vaccine or wild spike protein, rather than those used for viruses and other ailments.

In addition to instrumentation and equipment such as described above, analytical software is used with the aforesaid devices. Commercially available software, such as Applied Biosystems™ COVID-19 Interpretive Software, is used, except modified to contain the sequences for the vaccines and wild spike protein, instead of virus sequences, for identification and quantification. This software identifies the isolated structures (unique portions of the molecules sought to be identified and quantified) and, through reflection intensity (or functionally effective equivalent techniques) quantifies the identified target molecules. As an alternative to modification of existing software, the architecture of existing software is used to create new code (new programs) to achieve the same results.

Preferred PCR procedures are well known. Nonetheless, details of a preferred method to be used with the present invention in some embodiments, e.g., for a single-plex detection of Covid 19 spike protein, are given below. For others, modifications would be required, such as, the choices of primers, and/or the process of multiplexing (seeking detection of more than one target), wherein probes and especially different primer pairs, would be included for each of the two or more targets:

For the examples set forth below, the Thermo-Fisher Scientific TaqPath™ COVID-19 CE-IVD RT-PCR Kit and Instructions described above for performing the RT-PCR is used with the Applied Biosystems™ 7500 Fast Dx Real-Time PCR Instrument and modified software described above. For each RT-PCR reaction plate, the following controls are included: One Positive Control and One Negative Control from each extraction run. (For example, if RNA samples from 4 extraction runs are combined on one 384-well RT-PCR reaction plate, then 4 Negative Control wells must be run on that 384-well reaction plate.) Prepare the RT-PCR reaction plate on ice and keep it on ice until it is loaded into the real-time PCR instrument. In this procedure, run the plate immediately after preparation. Failure to do so could result in degraded RNA samples. To prevent contamination, prepare the reagents in a PCR workstation or equivalent amplicon-free area. We do not use the same pipette for controls and RNA samples, and always use aerosol barrier pipette tips. Maintain an RNase-free environment. Protect assays from light. The specific reagents used herein are the same as virus seeking PCR, except that vaccine components are used. Specifically, VAXX-specific primers that anneal to specific VAXX RNA and/or wild spike protein-specific primers that anneal to wild spike protein; and VAXX-specific probes that are probe-functional with specific VAXX RNA and/or wild spike protein-specific probes that are probe-functional with wild spike protein are used instead of the virus constructed primers and probes. Details of the present invention method VAXX-specific primers, wild spike protein-specific primers, VAXX-specific probes and wild spike protein-specific probes are set forth elsewhere herein.

Standard RNA isolation methods are used to initially process the human samples provided. The RNA samples and components are kept on ice during use. TaqPath™ COVID-19 CE-IVD RT-PCR Kit details set forth the preparation for PCR. For the RT-PCR reactions: ≤200-μL sample input volume, 96-well reaction plate. Thus, use an original sample input volume of up to 200 μL for extraction. The aforesaid selected Applied Biosystems instrument is compatible with 96-well RT-PCR reaction plates. If frozen, the reagents are thawed on ice. The reagents are gently vortexed, then centrifuged briefly to collect liquid at the bottom of the tube. TaqPath™ COVID-19 Control (1×104 copies/μL) are diluted to a working stock of 25 copies/μL: step a) Pipet 98 μL of TaqPath™ COVID-19 Control Dilution Buffer into a microcentrifuge tube, then add 2 μL of TaqPath™ COVID-19 Control. Mix well, then centrifuge briefly. Step b) Pipet 87.5 μL of TaqPath™ COVID-19 Control Dilution Buffer into a second microcentrifuge tube, then add 12.5 μL of the dilution created in step a). Mix well, then centrifuge briefly. Note: The TaqPath™ COVID-19 Control does not contain the MS2 template. Prepare the Reaction Mix: For each run, combine the following components sufficient for the number of RNA samples to be tested plus one Positive Control and one Negative Control. All volumes include 10% overage for pipette error. (The volumes in this list assume that the extracted sample RNA uses an original sample input volume of up to 200 μL.) Component: TaqPath™ 1-Step Multiplex Master Mix (No ROX™) (4×): 6.25 μL (this is volume per RNA sample or control); or 6.875×(n+2) μL (this is volume for n RNA Samples plus 2 controls); or 660 (μL this is volume for 94 RNA Samples plus 2 controls).

Next, set up the reaction plate. Pipette 15.0 μL of the Reaction Mix prepared above into each well of a MicroAmp™ Fast Optical 96-Well Reaction Plate with Barcode, 0.1 mL or a MicroAmp™ Optical 96-Well Reaction Plate with Barcode, 0.2 mL. Plates without a barcode can be used. Gently vortex the sealed plate containing the purified sample RNA and Negative Control from the RNA extraction procedure, then centrifuge briefly to collect liquid at the bottom of the plate. Unseal the plate containing the purified sample RNA and Negative Control from the RNA extraction procedure. Add either sample RNA, Negative Control, or Positive Control to each well of the reaction plate. Seal the plate thoroughly with MicroAmp™ Optical Adhesive Film. When applying the MicroAmp™ Optical Adhesive Film, ensure that pressure is applied across the entire plate and that there is a tight seal across every individual well. Failure to do so runs the risk of an improperly sealed well, leading to potential well-to-well contamination during vortexing and evaporation during PCR. Next, vortex the plate at the highest setting speed for 10-30 seconds with medium pressure. Move the plate around to ensure equal contact on the vortex mixer platform. (Vortex for 10-30 seconds to ensure proper mixing. Failure to do so might result in false classification of samples.) Centrifuge the reaction plate for 1-2 minutes at ≥650×g (≥650 RCF) to remove bubbles and to collect the liquid at the bottom of the reaction plate.

The PCR thermal protocol varies, depending upon the instrument and other factors, and incubation is a preferable first step of heating, followed by denaturing wherein the strands separate; annealing, where the primers bind to split strands; and extension wherein synthesis of new strands occurs. Generally, denaturing occurs above 90 degrees C.; annealing, below 65 degrees C.; and synthesis below 65 degrees C.

For purposes of PCR processing with vaccine and/or wild spike protein, incubation at 25 degrees C.; raising to 53 degrees C. for initial reverse transcription (10 minutes is recommended); following with an initial activation and denaturation step for (2 minutes plus 3 seconds); and then annealing at 60 degrees C. for 30 seconds. Thereafter, repeat cycles as follows: 3 seconds for denaturation at 95 degrees C. and 30 seconds for anneal and extension at 60 degrees C. Cycles are repeated to increase the number of molecules geometrically (2, 4, 8, 16, 32, 64, etc). The number of cycles may be in the order of 15 to 50, for example, and 15 to 20 cycles may reveal presence or absence of the target vaccine or wild spike protein. The SCR kits of Thermo-Fisher Scientific recommend 40 cycles for consistency and repeat reliable quantification, but 20 or more cycles will usually suffice.

Use the customized software to begin analysis of the multicyclic PCR process, and select the appropriate template file for the instrument. Failure to do so can cause errors in the analysis. Confirm the run settings in the template and adjust as necessary. Confirm that the reporter dye and the detector pairs are correct in the Detector Manager aspect of the software program. Confirm that the targets above are assigned to each well in the plate layout. Confirm the labeling of the control wells. The template has one positive control and one negative control assigned to wells for reference. Move the control well assignments by copying the existing control wells and pasting them according to their location on the physical plate. For wells with a positive control, confirm that Task is set to Standard. For wells with a negative control, confirm that Task is set to NTC. Edit the plate layout to assign a unique sample name to each well in the physical plate. For wells with a patient sample, confirm that Task is set to Unknown for all detectors. (Wells that do not have a sample name may not be analyzed by the software.) Coding for sample names is desirable. Combination codes with dates, patient initials and run numbers work well.

It should be noted that the foregoing procedures are described for pursuit of a single vaccine or wild spike virus. However, the methods herein can also be multiplexed to allow more than one vaccine and/or vaccine with wild spike protein to be detected. This is accomplished by include two or more different sets of probes and primers in the reagent mix as they relate to two or more different vaccines and/or vaccine with wild spike protein to be detected.

FIG. 1 is a block diagram showing some of the features of one embodiment of a Present Invention Method and FIG. 2 is a block diagram showing some of the remaining features of the Present Invention Method shown in FIG. 1. Thus, FIGS. 1 and 2 taken together include frames 1, 3, 5, 7, 9, 11, 13 that delineate the invention's salient features. FIG. 3 is a block diagram showing some of the features of Present Invention Preferred Method, namely, frames 31 and 33 set forth the present invention utilizing custom computer programs that have the architecture shown in frame 33. FIG. 4 shows a block diagram showing some of the features of another Present Invention Method, namely, multiplexing as presented by frames 41, 43, 45, 47 and 49.

EXAMPLES

The following examples are only examples of the present invention, and the present invention should not be limited thereto.

Example 1—Moderna Vaccine Pursuit

Five patients provide biological samples (in this case blood samples) who were vaccinated with HCV1146 Moderna (mRNA-1273) SARS-CoV-2 vaccine between 12 and fourteen months prior to providing the samples. Each of the five samples are properly identified/labeled and properly maintained under refrigeration prior to testing for the presence of the Moderna vaccine. Standard RNA isolation is performed on each of the samples provided, immediately prior to the RT-PCR testing. The procedures set forth above, using the Applied Biosystems™ 7500 Fast Dx Real-Time PCR Instrument and modified software described above and the Thermo-Fisher Scientific TaqPath™ TaqPath™

DuraPlex™ 1-Step RTqPCR Master Mix Kit and Instructions described above are used for performing the RT-PCR. The unique probe used for this Moderna vaccine pursuit is 5'-FAM-TGCTAGTTATTGAGGCTTAACAGGGAGGA-BHQ1-3' (SEQ ID NO: 37) (This probe binds a synthetic linker region inserted into the mRNA-1273 vaccine, absent in viral RNA and other vaccines.) The unique primers, generated by the above-described program, used for this Moderna vaccine pursuit are forward 5'-GAGTGGAAGGTTTGTCCGTTTG-3' (SEQ ID NO: 38) (Binds to the 5' UTR specific to Moderna's construct, absent in natural SARS-CoV-2 RNA.) and reverse 5'-CTTGTCCATGGAAGGTGACATG-3' (SEQ ID NO: 39) (Targets the optimized codon sequence in the S-protein mRNA, exclusive to Moderna's design). Thus, in addition to these probes and primers, the reagent solution for this PCR also includes a) TaqPath™ 1-Step RT-qPCR Master Mix b) Nuclease-free water c) RNA extracted from blood samples d) Positive control: In vitro transcribed mRNA from the Moderna vaccine sequence, and e) Negative control: No-template control (NTC). The reporter dyes that are used in the analysis are a) FAM (Fluorescein)→Detects Moderna vaccine mRNA b) VIC/HEX→Internal control (glyceraldehyde-3-phosphate dehydrogenase or another suitable, stably expressed human 'housekeeping' gene) c) ROX→Passive reference dye. These tests will reveal that all five samples contain the Modera vaccine and will provide a quantitative result.

Example 2—Pfizer Vaccine Pursuit

Six patients provide biological samples (in this case, saliva samples) who were last vaccinated with Pfizer-Biontech (BTN162b2) SARS-CoV-2 vaccine ("Pfizer vaccine") between 24 and 26 months prior to providing the samples. Each of the six samples are properly identified/labeled and properly maintained under refrigeration prior to testing for the presence of the Pfizer vaccine. Standard RNA isolation is performed on each of the samples provided, immediately prior to the RT-PCR testing. The procedures set forth above, using the Applied Biosystems™ 7500 Fast Dx Real-Time PCR Instrument and modified software described above and the Thermo-Fisher Scientific TaqPath™ 1-Step RT-qPCR Master Mix Kit and Instructions described are used for performing the RT-PCR. The unique probe used for this Pfizer vaccine pursuit is 5'-FAM-ACCTACGCTGACCTTCGTG-BHQ1-3' (SEQ ID NO: 40) (This probe binds to a sequence within the spike coding region that is unique to the vaccine mRNA.). The unique primers used for this Pfizer vaccine pursuit are Forward Primer: 5'-GTGCTGTTTGTGCTGCTCT-3' (SEQ ID NO: 41) (Designed to anneal near the 5' end of the spike gene segment present in the vaccine mRNA.) and Reverse Primer: 5'-CGTCTTCAGGTTGGTCAC-3' (SEQ ID NO: 42) (Designed to anneal downstream within the spike coding sequence). Thus, in addition to these probes and primers, the reagent solution for this PCR also includes a) TaqPath™ 1-Step RT-qPCR Master Mix b) Nuclease-free water c) RNA extracted from blood samples d) Positive control: In vitro transcribed mRNA from the Moderna vaccine sequence, and e) Negative control: No-template control (NTC). The reporter dyes that are used in the analysis are a) FAM (Fluorescein)→Detects Moderna vaccine mRNA b) VIC/HEX→Internal control (glyceraldehyde-3-phosphate dehydrogenase or another suitable, stably expressed human 'housekeeping' gene) and c) ROX→Passive reference dye. These tests will reveal that all six samples contain the Pfizer vaccine and will provide a quantitative result.

Example 3—Wild Spike Protein Pursuit

Ten patients provide biological samples (in this case blood samples) who were not vaccinated for SARS-CoV-2 vaccine prior to providing the patient test samples. Each of the ten samples are properly identified/labeled and properly maintained under refrigeration prior to testing for the presence of the Wild Spike Protein ("WSP"). Standard RNA isolation is performed on each of the samples provided, immediately prior to the RT-PCR testing. The procedures set forth above, using the Applied Biosystems™ 7500 Fast Dx Real-Time PCR Instrument and modified software described above and the Thermo-Fisher Scientific TaqPath™ 1-Step RT-qPCR Master Mix Kit and Instructions described above are used for performing the RT-PCR. The unique probe used for this WSP pursuit is 5'-FAM-ACCTGGTGTTGCTATCTCTGC-TAMRA-3' (SEQ ID NO: 43). The unique primers used for this WSP pursuit are forward: 5'-ACAGGTACGTTAATAGTTAATAGCGT-3' (SEQ ID NO: 44) and reverse: 5'-CTGACTTGAGCTTGTCTTCTG-3' (SEQ ID NO: 45). Thus, in addition to these probes and primers, the reagent solution for this PCR also includes a) TaqPath™ 1-Step RT-qPCR Master Mix b) Nuclease-free water c) RNA extracted from blood samples d) Positive control: In vitro transcribed mRNA from the wild-type spike protein sequence, and e) Negative control: No-template control (NTC). The reporter dyes that are used in the analysis are a) FAM (Fluorescein)→Detects Wildtype Spike Protein mRNA b) VIC/HEX→Internal control (glyceraldehyde-3-phosphate dehydrogenase or another suitable, stably expressed human 'housekeeping' gene) and c) ROX→Passive reference dye. These tests will reveal that all ten samples contain the wildtype spike protein and will provide a quantitative result.

Example 4—Multiplex Vaccine Pursuit

Six patients provide biological samples (in this case, saliva samples) who were last vaccinated with either Pfizer-Biontech (BTN162b2) SARS-CoV-2 vaccine ("Pfizer vaccine") or HCV1146 Moderna (mRNA-1273) SARS-CoV-2 vaccine or both, between 12 and 26 months prior to providing the samples. Each of the six samples are properly identified/labeled and properly maintained under refrigeration prior to testing for the presence of the Pfizer vaccine. Standard RNA isolation is performed on each of the samples provided, immediately prior to the RT-PCR testing. The procedures set forth above, using the Applied Biosystems™ 7500 Fast Dx Real-Time PCR Instrument and modified software described above and the Thermo-Fisher Scientific TaqPath™ 1-Step RT-qPCR Kit and Instructions described above are used for performing the RT-PCR. The unique probes and primers used for this Pfizer vaccine and Moderna vaccine pursuit were an equal mix of the probes and the primers sets described above in Examples 1 and 2. Thus, in addition to these probes and primers, the reagent solution for this PCR also includes a) TaqPath™ 1-Step RT-qPCR Master Mix b) Nuclease-free water c) RNA extracted from blood samples d) Positive control 1: In vitro transcribed mRNA from the Moderna vaccine sequence, and e) Negative control: No-template control (NTC). The reporter dyes that are used in the analysis are a) FAM (Fluorescein)→Detects Moderna vaccine mRNA b) VIC/HEX→Detects Pfizer vaccine mRNA and c) ROX→Internal control.

Example 5—Multiplex Vaccine/WSP Pursuit

Example 4 is repeated, except that wild spike protein replaces one of the two vaccines. The tests will reveal which of the six patients have been vaccinated with the vaccine, which contain WSP, and which have both, and will generate a quantitative result for each sample.

Examples 6, 7, 8, 9, 10—VAXX, WSP, Multiplex Vaccine and Multiplex Vaccine/WSP Pursuits For each of Examples 6, 7, 8, 9, 10, the following pursuits correspond: VAXX-1, VAXX-2, WSP, Multiplex Vaccine and Multiplex Vaccine/WSP Pursuits. For Example 6, the tests of Example 1 are repeated, except that all of the patients tested have never been vaccinated with any COVID vaccines. For Example 7, the tests of Example 2 are repeated, except that all of the patients tested have never been vaccinated with any COVID vaccines. For Example 8, the tests of Example 3 are repeated, except that all of the patients tested have never been vaccinated with any COVID vaccines. For Example 9, the tests of Example 4 are repeated, except that all of the patients tested have never been vaccinated with any COVID vaccines. For Example 10, the tests of Example 5 are repeated, except that all of the patients tested have never been vaccinated with any COVID vaccines.

The results for each of these Examples 6 through 10 tests will show which of the patients did and did not host the target vaccines/WSP and provide quantitative results as well.

Although particular embodiments of the invention have been described in detail herein, it is to be understood that the invention is not limited to those particular embodiments, and that various changes and modifications may be affected therein by one skilled in the art without departing from the scope or spirit of the invention as defined in the appended claims. For example, the vaccine types may be changed, or the number of cycles, or instruments or other aspects may be changed without exceeding the scope of the present invention. Likewise, yet to be created/manufactured vaccines may be pursued with the present invention methodology without exceeding the scope of the present invention.

What is claimed is:

1. A method of detecting, identifying and quantifying at least one nucleic acid coding for at least one spike protein selected from the group consisting of a SARS-CoV-2 wild-type spike protein and a COVID-19 vaccine spike protein in a patient to indirectly detect a vaccine or a wild-type spike protein variant in said patient, which comprises: (a) providing a biological sample from said patient, wherein said biological sample may include at least one spike protein selected from the group consisting of a SARS-CoV-2 wild-type spike protein and a COVID-19 vaccine spike protein, with at least one corresponding synthetic RNA, wherein a sequence of said at least one corresponding synthetic RNA differs from naturally occurring nucleic acid sequences; (b) isolating RNA from said biological sample by producing a lysed biological sample of RNA; (c) performing a reverse transcription polymerase chain reaction on said lysed biological sample of RNA to obtain a lysed, reverse transcribed biological sample of cDNA utilizing at least one primer set from the group consisting of SARS-CoV-2 wild-type spike protein-specific primers, COVID-19 vaccine spike protein-specific primers and combinations thereof and at least one probe set selected from the group consisting of SARS-CoV-2 wild-type spike protein-specific probes, COVID-19 vaccine spike protein-specific probes and combinations thereof; (d) performing an amplification reaction on said lysed, reverse transcribed biological sample of cDNA to obtain an amplified analyzable sample of said cDNA; and (e) performing a quantitative analysis to quantify said amplified analyzable sample of said cDNA, and thereby detect and identify and quantify said at least one corresponding spike protein.

2. The method of claim 1, wherein said reverse transcription polymerase reaction and amplification reaction on said lysed, reverse transcribed biological sample is performed with a set of Coronavirus vaccine primers specific for a Coronavirus vaccine nucleic acid sequence of a SARS-CoV-2 vaccine, wherein said set of Coronavirus vaccine primers amplify said Coronavirus vaccine nucleic acid sequence and corresponding Coronavirus vaccine synthetic RNA; and sequencing said amplified biological sample using next generation sequencing.

3. The method of claim 2, further comprising providing a positive identification for said SARS-Cov-2 vaccine when sequence readings from said Coronavirus vaccine nucleic acid sequence are detected.

4. The method of claim 2, wherein said Coronavirus vaccine nucleic acid sequence is selected from the group consisting of SEQ ID NO: 34 and SEQ ID NO: 35.

5. The method of claim 1, wherein said reverse transcription polymerase reaction and amplification reaction on said lysed, reverse transcribed biological sample is performed with a set of wild-type spike protein primers specific for SARS-CoV-2 wild-type spike protein nucleic acid sequence, wherein said set of SARS-CoV-2 wild-type spike protein primers amplify said SARS-CoV-2 wild-type spike protein vaccine nucleic acid sequence and corresponding SARS-CoV-2 wild-type spike protein synthetic RNA; and sequencing said amplified biological sample using next generation sequencing and providing a positive identification for SARS-CoV-2 wild-type spike protein if sequence reads from said SARS-CoV-2 wild-type spike protein nucleic acid sequence are detected.

6. A method of detecting, identifying and quantifying at least one nucleic acid coding for at least one spike protein selected from the group consisting of a SARS-CoV-2 wild-type spike protein and a COVID-19 vaccine spike protein in a patient to indirectly detect a vaccine or a wild-type spike protein variant in said patient, which comprises: (a) providing a biological sample from said patient, wherein said biological sample may include at least one spike protein selected from the group consisting of a SARS-CoV-2 wild-type spike protein and a COVID-19 vaccine spike protein, with at least one corresponding synthetic RNA, wherein a sequence of said at least one corresponding synthetic RNA differs from naturally occurring nucleic acid sequences; (b) isolating RNA from said biological sample by producing a lysed biological sample of RNA; (c) performing a reverse transcription polymerase chain reaction on said lysed biological sample of RNA to obtain a lysed, reverse transcribed biological sample of cDNA utilizing at least one primer set from the group consisting of SARS-CoV-2 wild-type spike protein-specific primers, COVID-19 vaccine spike protein-specific primers and combinations thereof and at least one probe set selected from the group consisting of SARS-CoV-2 wild-type spike protein-specific probes, COVID-19 vaccine spike protein-specific probes, and combinations thereof; (d) performing an amplification reaction on said lysed, reverse transcribed biological sample of cDNA to obtain an amplified analyzable sample of said cDNA; and (e) performing a quantitative analysis to quantify said amplified analyzable sample of said cDNA, and thereby detect and identify and quantify said at least one corresponding spike protein; and further wherein said method is a multiplexing method that includes the use of probes and primers for at least two different target vaccines to indirectly detect, identify and quantify said at least two different vaccine targets.

7. The method of claim 6, wherein said method is a multiplexing method that includes the use of probes and primers for at least one target COVID-19 vaccine and one target SARS-CoV-2 wild-type spike protein variant to indirectly detect, identify and quantify said at least one COVID-19 vaccine target and one SARS-CoV-2 wild-type spike protein variant.

8. The method of claim 7, further comprising lysing said biological sample utilizing thermal lysis, wherein said thermal lysis comprises heating said biological sample to a temperature of at least 50° C.

9. The method of claim 7, wherein said reverse transcription polymerase reaction is a real time reverse transcription polymerase reaction.

10. The method of claim 9, wherein said real time reverse transcription polymerase reaction includes the use of probes selected from the group consisting of fluorescent probes and molecular beacon fluorescent probes.

11. The method of claim 10, wherein said real time reverse transcription polymerase reaction includes quantitative analysis based on light emitting intensity.

12. The method of claim 10, wherein said real time reverse transcription polymerase reaction includes the use of primers structurally generated by a software program by inserting the COVID-19 vaccine spike protein sequence or SARS-CoV-2 wild-type spike protein sequence into said program.

13. A method of detecting, identifying and quantifying at least one nucleic acid coding for at least one spike protein selected from the group consisting of a SARS-CoV-2 wild-type spike protein and a COVID-19 vaccine spike protein in a patient to indirectly detect a vaccine or a wild-type spike protein variant in said patient, which comprises: (a) providing a biological sample from said patient, wherein said biological sample may include at least one spike protein selected from the group consisting of a SARS-CoV-2 wild-type spike protein and a COVID-19 vaccine spike protein with at least one corresponding synthetic RNA, wherein a sequence of said at least one corresponding synthetic RNA differs from naturally occurring nucleic acid sequences; (b) isolating RNA from said biological sample by producing a lysed biological sample of RNA; (c) performing a reverse transcription polymerase chain reaction on said lysed biological sample of RNA to obtain a lysed, reverse transcribed biological sample of cDNA utilizing at least one primer set from the group consisting of COVID-19 vaccine spike protein-specific primers, SARS-CoV-2 wild-type spike protein-specific primers and combinations thereof and at least one probe set selected from the group consisting of COVID-19 vaccine spike protein-specific probes, SARS-CoV-2 wild-type spike protein-specific probes and combinations thereof; (d) performing an amplification reaction on said lysed, reverse transcribed biological sample of cDNA to obtain an amplified analyzable sample of said cDNA; (e) performing a quantitative analysis to quantify said amplified analyzable sample of said cDNA; and (f) utilizing a computer having a central processing unit, with a computer primer listing computer program established in said computer central processing unit to define at least one primer set from the group consisting of COVID-19 vaccine spike protein-specific primers, SARS-CoV-2 wild-type spike protein-specific primers and combinations thereof, said computer program designed to generate a list of said at least one primer set based on inputs of sequence data of one or more sequences selected from the group consisting of wild-type spike protein and a virus vaccine spike protein, and combinations thereof, and operating said program to create a list of primer pairs corresponding to said group consisting of SARS-CoV-2 wild-type spike protein and COVID-19 vaccine spike protein, creating at least one corresponding primer pair, and utilizing said primer pair in said step (c) above, to thereby detect and identify and quantify said at least one spike protein and thus indirectly detect and identify and quantify the target vaccine or wild-type spike protein variant.

14. The method of claim 13, wherein said primer listing computer program includes the following computing capabilities:

a) Receiving and storing sequences of one or more vaccines having spike proteins, and/or wild-type spike protein sequences via sequence package input(s);
b) Setting primer generation parameters relating to step a) sequence(s);
c) Setting primer filtering parameters relating to step a) sequence(s);
d) Defining Amplicon Filtering criteria relating to step a) sequence(s);
e) Matching parameters of step a) sequence(s) to possible prime matching;
f) Applying primer subset parameters to accelerate processing;
g) Generating a candidate list of forward primers;
h) Generating a candidate list of reverse primers;
i) Pairing selected forward and reverse primers;
j) Applying parallel processing parameters to present available cores; and
k) Generating an output list of unique primer pairs.

15. The method of claim 13, wherein said reverse transcription polymerase reaction and amplification reaction on said lysed, reverse transcribed biological sample is performed with a set of Coronavirus vaccine primers specific for a Coronavirus vaccine nucleic acid sequence, wherein said set of Coronavirus vaccine primers amplify said Coronavirus vaccine nucleic acid sequence and corresponding Coronavirus vaccine synthetic RNA; and sequencing said amplified biological sample using next generation sequencing.

16. The method of claim 13, further comprising providing a positive identification for Coronavirus vaccine if sequence reads from said Coronavirus vaccine nucleic acid sequence are detected.

17. The method of claim 13, wherein said Coronavirus vaccine nucleic acid sequence is selected from the group consisting of SEQ ID NO: 34 and SEQ ID NO: 35.

18. The method of claim 13, wherein said reverse transcription polymerase reaction and amplification reaction on said lysed, reverse transcribed biological sample is performed with a set of wild-type spike protein primers specific for wild-type spike protein nucleic acid sequence, wherein said set of wild-type spike protein primers amplify said wild-type spike protein vaccine nucleic acid sequence and corresponding wild-type spike protein synthetic RNA; and sequencing said amplified biological sample using next generation sequencing and providing a positive identification for wild-type spike protein if sequence reads from said wild-type spike protein nucleic acid sequence are detected.

19. The method of claim 13, wherein said method is a multiplexing method that includes the use of probes and primers for at least two different target vaccines to indirectly detect, identify and quantify said at least two different vaccine targets.

20. The method of claim 13, wherein said method is a multiplexing method that includes the use of probes and primers for at least one target vaccine and one wild-type spike protein variant to indirectly detect, identify and quantify said at least one vaccine target and one wild-type spike protein variant.

21. The method of claim 13, further comprising lysing said biological sample utilizing thermal lysis, wherein said thermal lysis comprises heating said biological sample to a temperature of at least 50° C.

22. The method of claim 21, wherein said reverse transcription polymerase reaction is a real time reverse transcription polymerase reaction.

23. The method of claim 22, wherein said real time reverse transcription polymerase reaction includes the use of probes selected from the group consisting of fluorescent probes and molecular beacon fluorescent probes.

24. The method of claim 22, wherein said real time reverse transcription polymerase reaction includes quantitative analysis based on light emitting intensity.

25. A reaction mixture for determining the presence or absence of nucleic acid encoding a spike protein selected from the group consisting of a COVID-19 vaccine spike protein and a SARS-CoV-2 wild-type spike protein in a biological sample, comprising: a synthetic nucleic acid of one of: a COVID-19 vaccine spike protein and a SARS-CoV-2 wild-type spike protein, and at least a portion of a biological sample from an individual, and one or more enzymes or reagents sufficient to amplify said synthetic nucleic acid in said biological sample from said individual, when present.

26. The reaction mixture for determining the presence or absence of nucleic acid encoding a spike protein in the biological sample of claim 25 wherein said synthetic nucleic acid is encoding a COVID-19 vaccine spike protein.

* * * * *